United States Patent
White et al.

(10) Patent No.: US 9,661,254 B2
(45) Date of Patent: May 23, 2017

(54) VIDEO VIEWING SYSTEM WITH VIDEO FRAGMENT LOCATION

(71) Applicant: Shadowbox Media, Inc., College Station, TX (US)

(72) Inventors: Jake Thomas White, Austin, TX (US); Oliver Stayton White, Austin, TX (US)

(73) Assignee: Shadowbox Media, Inc., College Station, TX (US)

( * ) Notice: Subject to any disclaimer, the term of this patent is extended or adjusted under 35 U.S.C. 154(b) by 0 days.

(21) Appl. No.: 14/631,650

(22) Filed: Feb. 25, 2015

(65) Prior Publication Data

US 2015/0334335 A1    Nov. 19, 2015

Related U.S. Application Data

(60) Continuation-in-part of application No. 14/531,528, filed on Nov. 3, 2014, which is a division of application No. 14/279,456, filed on May 16, 2014, now Pat. No. 8,896,765.

(51) Int. Cl.
*H04N 5/44*     (2011.01)
*H04N 21/422*   (2011.01)
*H04N 21/41*    (2011.01)

(52) U.S. Cl.
CPC ....... *H04N 5/4403* (2013.01); *H04N 21/4126* (2013.01); *H04N 21/4222* (2013.01); *H04N 21/42224* (2013.01); *H04N 2005/443* (2013.01); *H04N 2005/4408* (2013.01); *H04N 2005/4425* (2013.01)

(58) Field of Classification Search
USPC ................ 348/734, 563–566, 569; 725/9, 59
See application file for complete search history.

(56) References Cited

U.S. PATENT DOCUMENTS

| | | |
|---|---|---|
| 5,594,469 A | 1/1997 | Freeman |
| 6,166,736 A | 12/2000 | Hugh |
| 6,931,660 B1 | 8/2005 | Kalluri |
| 7,305,691 B2 | 12/2007 | Cristofalo |
| 7,373,414 B2 | 5/2008 | Evron |

(Continued)

FOREIGN PATENT DOCUMENTS

| | | |
|---|---|---|
| WO | 2010/090946 A1 | 8/2010 |
| WO | 2013163291 | 10/2013 |
| WO | 2015031802 | 3/2015 |

OTHER PUBLICATIONS

Ingrid Lunden "OpenTV, Nagra Pile Another Patent Suit on Netflix as they Gear Up for Apple Fight", TechCrunch, Apr. 15, 2014.

(Continued)

*Primary Examiner* — Paulos M Natnael
(74) *Attorney, Agent, or Firm* — Duane Morris LLP

(57) ABSTRACT

Systems and methods for personalized video display include providing a graphical user interface on a touch device, including a video display window as part of the graphical user interface, and sending information representing the graphical user interface to a television. Additionally, the touch device can communicate messages to a remote platform, and the messages can indicate specific fragment locations within a given selection of media being delivered to the touch device as an adaptive bitrate stream.

10 Claims, 12 Drawing Sheets

(56) References Cited

U.S. PATENT DOCUMENTS

| | | | |
|---|---|---|---|
| 7,644,429 B2 | 1/2010 | Bayassi | |
| 7,911,456 B2 | 3/2011 | Gillespie | |
| 8,253,746 B2 | 8/2012 | Geisner | |
| 8,321,541 B1 | 11/2012 | Bennett | |
| 8,332,268 B2 | 12/2012 | Carruthers | |
| 8,386,304 B2 | 2/2013 | Chen | |
| 8,416,217 B1 | 4/2013 | Eriksson | |
| 8,564,544 B2 | 10/2013 | Jobs | |
| 8,621,541 B2 | 12/2013 | Ullman | |
| 8,693,848 B1 | 4/2014 | Pacor | |
| 8,711,200 B2 | 4/2014 | Blackburn | |
| 8,896,765 B1* | 11/2014 | White | H04N 5/4403 348/734 |
| 9,043,850 B2* | 5/2015 | Hoffert | H04N 5/44591 725/43 |
| 9,063,640 B2* | 6/2015 | Hoffert | G06F 3/0482 |
| 2004/0143838 A1 | 7/2004 | Rose | |
| 2004/0163127 A1* | 8/2004 | Karaoguz | H04L 67/327 725/120 |
| 2004/0247139 A1 | 12/2004 | Wang | |
| 2007/0024705 A1 | 2/2007 | Richter | |
| 2007/0182595 A1 | 8/2007 | Ghasabian | |
| 2007/0252912 A1 | 11/2007 | Valente | |
| 2008/0010654 A1 | 1/2008 | Barrett | |
| 2008/0244641 A1 | 10/2008 | Ho | |
| 2009/0210491 A1 | 8/2009 | Thakkar | |
| 2009/0313658 A1* | 12/2009 | Nishimura | H04N 5/44543 725/59 |
| 2010/0066677 A1 | 3/2010 | Garrett | |
| 2010/0088634 A1 | 4/2010 | Tsuruta | |
| 2010/0235528 A1 | 9/2010 | Bocharov et al. | |
| 2010/0333044 A1 | 12/2010 | Kethireddy | |
| 2011/0004839 A1 | 1/2011 | Cha | |
| 2011/0063522 A1* | 3/2011 | Karaoguz | G06F 3/0304 348/734 |
| 2011/0090407 A1 | 4/2011 | Friedman | |
| 2011/0126255 A1 | 5/2011 | Perlman | |
| 2011/0179436 A1 | 7/2011 | Candelore | |
| 2011/0247031 A1 | 10/2011 | Jacoby | |
| 2011/0310221 A1 | 12/2011 | Meuninck | |
| 2012/0151535 A1 | 6/2012 | Ramdeo | |
| 2012/0179970 A1* | 7/2012 | Hayes | G06F 3/04883 715/722 |
| 2012/0204106 A1* | 8/2012 | Hill | G06F 1/1654 715/716 |
| 2012/0210350 A1 | 8/2012 | McCoy | |
| 2012/0317598 A1 | 12/2012 | Gilson | |
| 2013/0014136 A1* | 1/2013 | Bhatia | H04N 21/252 725/9 |
| 2013/0019263 A1 | 1/2013 | Ferren | |
| 2013/0067108 A1 | 3/2013 | Nooney et al. | |
| 2013/0125171 A1 | 5/2013 | Sharif-Ahmadi | |
| 2013/0278828 A1 | 10/2013 | Todd | |
| 2014/0009386 A1 | 1/2014 | Liu et al. | |
| 2014/0016040 A1 | 1/2014 | Motoyama et al. | |
| 2014/0053180 A1 | 2/2014 | Shoykher | |
| 2014/0059615 A1 | 2/2014 | Sirpal | |
| 2014/0130069 A1 | 5/2014 | Khare et al. | |
| 2014/0267911 A1* | 9/2014 | Grant | H04N 21/42222 348/563 |
| 2016/0007083 A1* | 1/2016 | Gurha | H04N 21/44222 725/13 |

OTHER PUBLICATIONS

Divisional Application U.S. Appl. No. 14/531,528, filed Nov. 3, 2014.

PCT/US201337983, "International Application Serial No. PCT/US2013/37983, International Search Report and Written Opinion, mailed Jun. 19, 2013" 12 pages.

PCT/US2013/037983, "International Application No. PCT/US2013/037983, International Preliminary Report on Patentability With Written Opinion, mailed Nov. 6, 2014" Skreens Enterntainment Technologies, Inc., 10 pages.

PCT/US2014/053491, "International Application Serial No. PCT/US2014/053491, International Search Report and Written Opinion mailed Dec. 9, 2014" Skreens Enterntainment Technologies, Inc., 15 pages.

International Searching Authority, International Search Report and Written Opinion for PCT/US16/19399 mailed Jul. 26, 2016, 7pgs.

International Searching Authority, International Preliminary Report on Patentability for corresponding International Application No. PCT/US2014/061908 dated Nov. 22, 2016, 11pgs.

\* cited by examiner

VIDEO VIEWING SYSTEM WITH VIDEO FRAGMENT LOCATION

RELATED AND CO-PENDING APPLICATION

This application is a continuation-in-part and claims priority to co-pending U.S. application entitled "Systems and Methods for Remote Control of A Television," application Ser. No. 14/531,528 filed Nov. 3, 2014, which is a division of application Ser. No. 14/279,456 filed May 16, 2014, now issued as U.S. Pat. No. 8,896,765, the entirety of which disclosures are hereby incorporated herein by reference.

FIELD OF THE DISCLOSURE

The present disclosure generally relates to a video viewing system.

BACKGROUND

Smart televisions greatly expand the content available for viewing on the television and can simplify the entertainment center setup. Smart televisions can be connected to the internet through a hard wired connection or a wireless connection. Access to the internet enables access to a wide variety of content available online, including video-on-demand services such as Netflix, Hulu, Amazon Prime, and the like, as well as user provided content such as YouTube, Vine, and the like. In addition to video content, there is a large amount of audio and image content available through the internet. While the internet provides a vast source of content, smart televisions can also receive content from traditional sources, such as over-the-air broadcast, cable or satellite providers, game consoles, DVD or Blu-ray players, and the like, through a variety of input ports, such as HDMI, composite video, component video, coaxial connectors, VGA connectors, and the like. Additionally, smart television can access physical digital media, such as hard drives, flash drives, SD cards, and the like.

With the vast array of content accessible by a smart television, it will be appreciated that a need exists for interacting with smart televisions.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
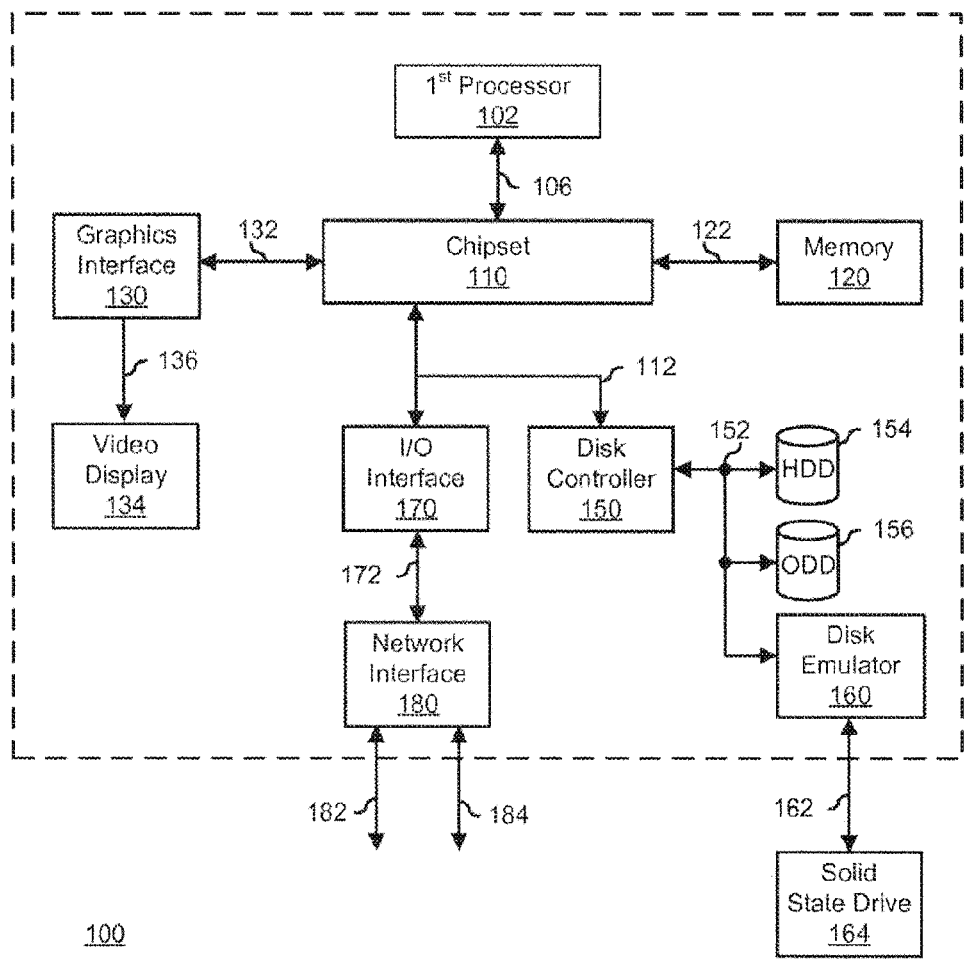
FIG. 1 is a block diagram of an exemplary information handling system.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a smart television, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the described methods. Information handling system 100 includes a processors 102, a chipset 110, a memory 120, a graphics interface 130, a disk controller 150, a disk emulator 160, an input/output (I/O) interface 170, and a network interface 180. Processor 102 is connected to chipset 110 via processor interface 106. Memory 120 is connected to chipset 110 via a memory bus 122. An example of memory 120 includes random access memory (RAM) such as static RAM (SRAM), dynamic RAM (DRAM), non-volatile RAM (NV-RAM), or the like, read only memory (ROM), another type of memory, or a combination thereof. Graphics interface 130 is connected to chipset 110 via a graphics interface 132, and provides a video display output 136 to a video display 134.

Disk controller 150 and I/O interface 170 are connected to chipset 110 via an I/O channel 112. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to network interface 180. Peripheral interface 172 can be the same type of interface as I/O channel 112, or can be a different type of interface. Network interface 180 represents a NIC disposed within information handling system 100, on a main circuit board of the information handling system, integrated onto another component such as chipset 110, in another suitable location, or a combination thereof.

Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Alternatively, network channels 182 and 184 can be wireless communications channels, such as Wi-Fi, Bluetooth, or the like. Network channels 182 and 184 can be connected to external network resources (not illustrated). The network resource can include another information handling system, a data storage system, another network, a grid management system, another suitable resource, or a combination thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures. Moreover, if a claim is intended to invoke section 112(f) of 35 USC, the claim will include the exact phrase "means-for" or "step-for".

In various embodiments, an information handling system may utilize a touch sensitive display assembly for the combined functionality of the video display and input devices such as mouse and keyboard. Various technologies are known in the art for detecting touch inputs, such as capacitive touch detection, resistive touch detection, surface acoustic wave detection, infrared grid detection, optical imaging, acoustic pulse recognition, infrared acrylic projection, dispersive signal detection, and planar scatter detection. The touch detection technology can rely upon emitters, detectors, or connections around the edge of the display, and it can be desirable to obscure those emitters, detectors, or connections.

In various embodiments, a trackpad can be implemented with a touch-sensing planar digitizer input device used instead of, or in conjunction with, a mouse, trackball or joystick. During use, a user can place a finger on the trackpad and can move the finger along the touch-sensing planar surface. The trackpad can detect the movement of the finger and, in response, can provide motion signals to a communicatively coupled device. In operation, a trackpad software program can convert the detected movement pattern into specific cursor control signals (e.g., location, direction and magnitude of motion).

Trackpad sensor devices can be, for example, resistive and/or capacitive in their operation. In various embodiments, a resistive trackpad sensor can be a mechanical sensor that uses two layers of material that are separated by air. Pressure from a finger can push the top layer (such as a thin, dear polyester film) so that it touches the bottom layer (which may be, for example, glass). The voltage at the contact point can be measured and the finger's location can be computed and transmitted to a connected system. After the finger is removed, the top layer can return to its original configuration.

In various embodiments, a capacitive touchpad sensor may be implemented as a solid-state sensor made using printed circuit board ("PCB") technology and/or a flex circuit of glass substrate technology. A finger on, or in close proximity to, a top grid of conductive traces can change the capacitive coupling between adjacent traces. This change in capacitance can be measured and finger position can be computed.

In various embodiments, a designer may elect to create a touchpad for a remote device using the touch screen of a smartphone, tablet, or other device to act as the trackpad surface. There may be, for example, three components used in such a solution: the touch sensor, the controller, and software. The touch sensor can be implemented as a panel with a touch responsive surface. Such a system may be built based on different types of sensors: resistive, surface acoustic wave, capacitive, infrared, frustrated total internal reflectance, or the like. In various embodiments, the chosen sensor can have signals running through it and touching the screen can cause a signal change. The signal change can be used to determine the location of the touching. The controller can include hardware that converts the signal changes on the sensor into information about the location of the touch that a computing or other device can receive and use. The software can perform an action based on the information coming from the controller.

In one system incorporating teachings of the disclosure, a multi-component system can allow a smartphone or tablet to act as a touchpad interface for a remote device such as a television. A designer of such a system may make various design and/or implementation decisions that incorporate the disclosed teachings even if the system as finally implemented does not look like one of the figures included herein. In one system, a designer may make use of a touch sensor on a smartphone or tablet, a controller (which may be electronic components within the smartphone or tablet), software (which may be a launchable application stored on the smartphone or tablet), an additional launchable application (which may be stored on a remote device like a television), and various wireless enabled communication devices (which may comply with Wi-Fi, Bluetooth, and/or some other communication protocol and may be incorporated within devices such as the smartphone or tablet, the television, a dongle configured for attachment to the smartphone, tablet, or television, a wireless router, or the like).

In various embodiments, an application can be pre-loaded or made available for downloading to a touch device, such as smartphone or tablet. With the application loaded, the application may recognize a signal from a controller on the touch device as indicative of a touch or near touch at a given location on the touchscreen, which may be mapped as an X-Y coordinate. The application may be capable of communicating with a remote device and/or an additional application loaded on a to-be-controlled device (e.g., a television and/or a dongle or set top box, attached to a television). The application and the additional application may be calibrated to allow the X-Y coordinates that are associated with the location touched by a user on the touchscreen of the controlling device to the mapped to a set of X-Y coordinated that are associated with all or a portion of the screen of the to-be-controlled device.

In various embodiments, a user may be able to separate a television screen into one or more windows. If the user has set the television to have one window that encompasses the entire viewing area of the television, the X-Y coordinate system used by the additional application may cover the entire screen. If a user has separated the viewing area into two windows, the additional application may maintain a first set of X-Y coordinates for one of the windows and a second set of X-Y coordinates for the other window. In such a system, the touch device application may allow the user to indicate which of the two windows the trackpad should be mapped to, and the additional application can, in response, indicate cursor movement in the to-be-controlled window.

As an example of a two window viewing experience, a user can watch a live sporting event in a large Window that is maintaining a 4:3 viewing perspective. The television can be a wide screen television with a 16:9 viewing area ratio. In various embodiments, Window 1 may be open and showing the sporting event on the left side of the screen. Given the viewing ratios, Window 2 may be created on the right side of the screen. In some cases, the user can have a social media feed available in Window 2. For example, a user can be watching a game at the same time a group of friends are watching the same game at other locations. The group of friends can open a group text to talk about the game and the various group text messages may appear in Window 2.

As the user is watching television, the user may want to use an application that offers a trackpad mode while executing on a touch device. The trackpad mode of the application may allow the user to "point" and/or "select" elements appearing in Window 1, Window 2, and/or additional windows. The trackpad mode of the application may allow the user, for example, to switch between Window 1 control and Window 2 control. In various embodiments, an application (which may be the one on the tablet and/or one on the television) may access a mapping table to link the X-Y coordinate associated with the location touched on the tablet with a corresponding location within Window 1 or 2. Moreover, the application running on the touch device may recognize that the given window selected via the trackpad includes content that allows for and/or requires an inputting of textual data. For example, if a user touches a trackpad location and selects a window presenting a social media feed, the application may switch from trackpad mode to a textual input mode. In some embodiments, the textual input mode may include a keyboard or partial keyboard that is presented "on top" of the trackpad screen. In practice, the trackpad screen may appear as a black screen with or without a right and left mouse click portion. Moreover, the trackpad mode may be entered automatically in response to "throwing" the application display area content to a television, in response to a user gesture on the touchscreen indicating a desire to enter a trackpad mode, and/or after some pre-defined amount of time has passed following a triggering event (e.g., five seconds after throwing the display area to a television). In practice, the pre-defining of time may be built into the application and/or adjusted by a user with an edit option of the application.

Figure 2:
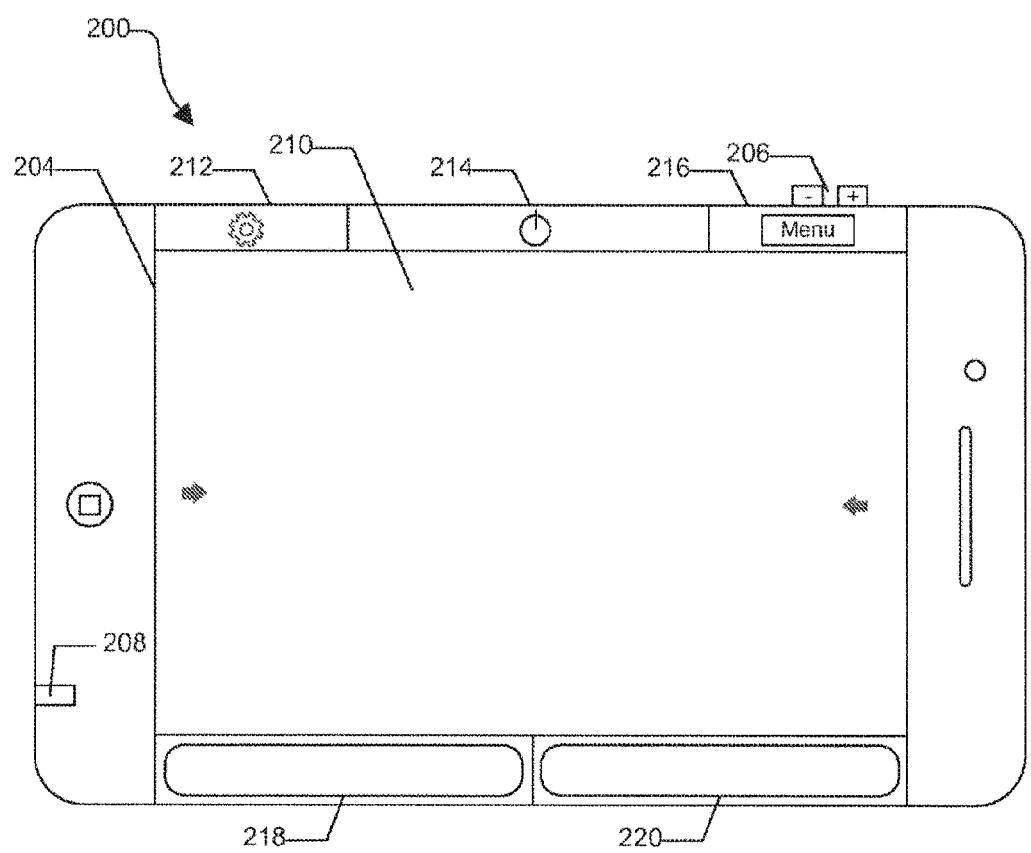
FIG. 2 is a block diagram of an exemplary touch device.

FIG. 2 illustrates a block diagram of an exemplary touch device, generally designated 200, with an interface for remote control of a smart television. In exemplary embodiments, the touch device can be a smart phone, such as a iPhone, an Android phone, a Windows 8 phone, or the like, a tablet such as an iPad, an iPod Touch, an Android tablet a Microsoft Surface, or the like, or other device with a touch sensitive display. The touch device 200 can have a touch sensitive display 204 upon which the interface is displayed. Additionally, the touch device 200 can have volume control buttons 206 and a head phone port 208.

The interface of touch device 200 can include a gesture area 210 operable for receiving gestures. In various embodiments, the gestures can be used to control a cursor on the smart television, make a selection on the small television, alter the arrangement of the information displayed on the smart television, and the like. In particular embodiments, the gesture area 210 can be substantially free of graphic content, such as by having a solid black background. Alternatively, the gesture area 210 may include graphical or textual content that is substantially different than the graphical or textual content displayed on the smart television. For example, the gesture area 210 may display graphical and textual clues to guide a user in operating the interface, such as images of available gestures.

The interface of touch device 200 can include selection elements 212, 214, 216, 218, and 220. Upon a touch received at one of selection elements 212, 214, 216, 218, and 220 the touch device can perform a specific operation associated with the selection element.

Selection element 212 can be a settings selection element in various embodiments, when selection element 212 is activated, such as by a touch registered at the corresponding area of the touch sensitive display 204, a settings interface can be displayed on the touch device. Alternatively, a settings interface can be displayed on the television. The settings interface may be used to adjust settings related to the operation of the touch device, the operation of the television, or the interaction between the touch device and the television.

Selection element 214 can be a power selection element. In various embodiments, when selection element 214 is activated, such as by a touch registered at the corresponding area of the touch sensitive display 204, the touch device can send an instruction to the television to cycle the power. For example, when the television is in an "on" state, the instruction can cause the television to enter into a "standby" or "off" state. Alternatively, when the television is in the "standby" state, such that the television is still capable of communicating with the touch device, but the display is powered off, the instruction can cause the television to enter into the "on" state.

Selection element 216 can be a menu selection element. In various embodiments, when selection element 216 is activated, such as by a touch registered at the corresponding area of the touch sensitive display 204, a menu can be displayed on the touch device. Alternatively, the menu can be displayed on the television display. In particular embodiments, the menu can display a list of applications available on the smart television, such as Netflix, Hulu, YouTube, a web browser, or the like. The applications can enable the smart television to access content unavailable to a traditional television, such as content that is available through the internet. Additionally, the applications may enable the smart television to perform various additional tasks, such as interactive games and the like.

Selection elements 218 and 220 can behave like buttons on a mouse, such as the left and right buttons respectively. For example, when a cursor on the display of the television is at a chosen application in the app menu, activation of selection element 218 can launch the chosen application. Similarly, when using a web browser application on the television, activation of selection element 218 can follow a hyperlink on a displayed webpage. In various embodiments, activation of selection element 220 can bring up a contextual menu, such as to provide the option to open the hyperlink in a new window, add the page to a set of bookmarks, or the like. Alternatively, an application may use a "right mouse click" or activation of selection element 220 to perform a specific action rather than lining up a contextual menu.

In various embodiments, operation of volume control buttons 206 can cause the touch device 200 to instruct the television to adjust the volume. Alternatively, when headphones are plugged into the headphone port 208, the volume control buttons 206 can be used to control the volume of the headphones. In particular embodiments, the television may send an audio stream to the touch device 200, and the touch device 200 can provide playback of the audio stream to the headphones. In this way, an individual with limited hearing can use the headphones to provide improved heading while maintaining the volume of the television at a normal level. Additionally, an individual wanting to use the television without disturbing others in the vicinity could use mute the television and use the headphones to listen to the content on the television.

Figure 3:
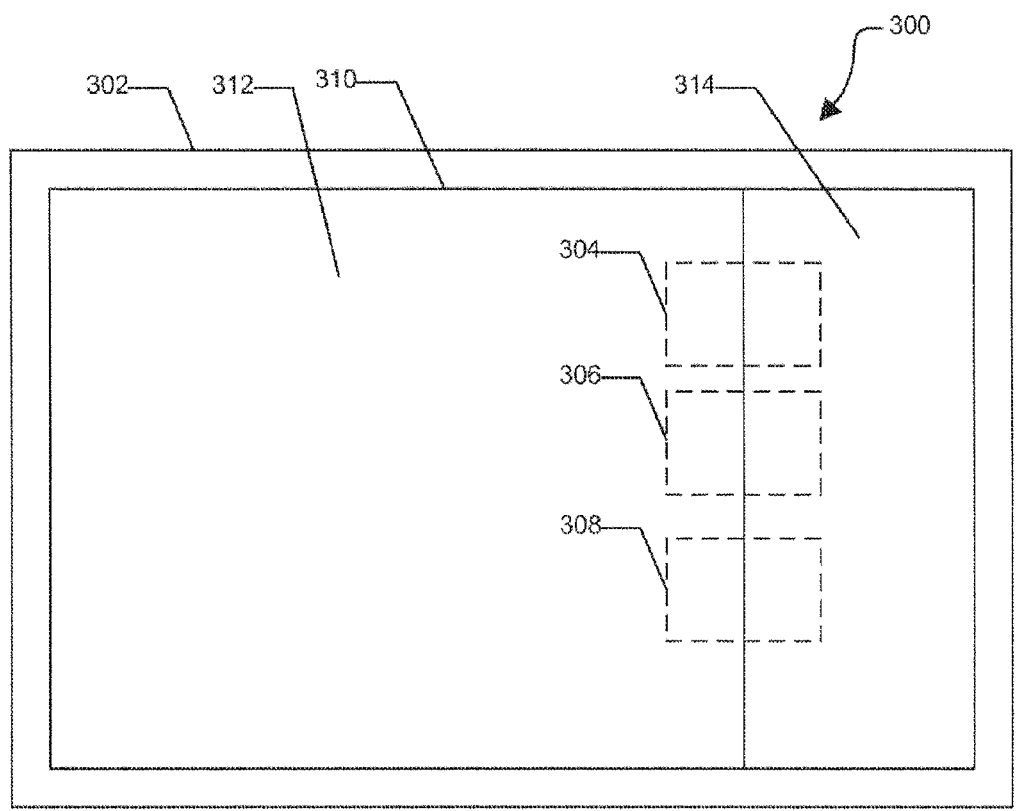
FIG. 3 is a block diagram of an exemplary smart television.

FIG. 3 illustrates a block diagram of a smart television, generally designated 300. The smart television 300 can include a housing 302, a processor 304, a memory 306, a wireless communications interface 308, and a display 310. The processor 304 can be configured to decode and playback on the display 310 content that is available through traditional television interfaces, such as HDMI, component video, composite video, and the like, and content available through a network, such as a network accessed by the wireless communications interface 308. Additionally, processor 304 can access content, such as video content, applications, and the like, stored in the memory 306. Additionally, memory 306 can store instructions for the operation of the processor 304, as well as settings, credentials for communication with remote devices, and other information necessary fix the operation of the smart television 300.

In various embodiments, the display 310 can provide multiple viewing areas, such as primary video display area 312 and user selectable display area 314. The primary video display area 312 can provide an area for the playback of video content. The user selectable display area 314 can provide an area for display of supplemental information. The supplemental information can include information about the video content, such as directors, actors, plot summary, ratings, suggestions for related video content, and the like. Alternatively, the supplemental information can display information from social media, such as a Twitter feed, a Facebook timeline, or the like. The social media content may be related to the video content, or may be unrelated to the video content. For example, when watching a broadcast of a live sporting event, a user's Twitter feed may be displayed. The user may, for example, follow the Twitter account of one of the sporting teams and receive social media content related to the sporting event. Additionally, the user may follow the twitter account of individuals not associated with either of the teams, and may receive social media content unrelated to the sporting event. Additionally, the user may interact with others by tweeting about the sporting event or other things. In particular embodiments, the displayed Twitter feed may be filtered to only display content with hashtags related to the sport, teams playing in the sporting event, and the sporting event, thereby limiting the displayed social media content to content related to the sporting event.

In various embodiments, the display may be further divided into additional video display areas or additional user selectable information display areas. Additionally, the number of display areas, and the relative positioning of the various display areas may be a user adjustable parameter. In some embodiments, a user may have a smartphone and/or tablet application executing on an appropriate device (such as the one depicted in FIG. 9). The application may be customizable by the user before and/or after the application has been loaded onto a touch device. The application may facilitate the user's ability to control and/or personalize a smart television viewing experience. For example, the application may be implemented using a system like Google's Chrome and may work with a television dongle such as Google's Chromecast. Moreover, the application may be part of a larger cloud-based system.

A user may be able to access a website, enter personal log-in credentials, and see a web presented version of the user's "my Television" application. The user may be able to utilize the website and/or their own touch device to create a customized interface for the application with multiple windows, and each window may offer the user a given and/or pre-selected range of content feed options. In such an embodiment, a local instance of the my Television application may be launched, for example, on a tablet, and the user may throw the application's personalized screen to a television via a dongle connected to a television, a set top box or game console connected to a television, and/or the television itself. In some cases, the television may "receive" the personalized screen as a template with defined windows and URL's or other identifiers for remote sources of the content intended to populate a given window. In some cases, the my Television application may recognize that content has been thrown to a television device and may switch into a trackpad mode. The switch may happen automatically and/or in response to some user interaction with the tablet.

In various embodiments, the display area of each window may have a unique coordinate space, such as defined by X, Y coordinates. Using the X, Y coordinate space of each display area, gestures detected by the touch device can be mapped to locations within a display area. In various embodiments, each display area can have an independent coordinate space, such that a selection of an active display area could allow the application to map a location on the touch device to a location within the active display area. For example, the upper left hand corner of each display area can be defined as 0,0, thus multiple locations on display 310 can be addressed by the same coordinate pair and distinguished by a third value representing the selected display area. Alternatively, the display areas can share a common coordinate system based on a coordinate system for display 310. For example, the upper left hand corner of the display can be defined as 0,0, and the upper left hand corner of each window can be defined by the relative position on the display 310. Thus, each coordinate pair can uniquely address a location within the display.

Figure 4:
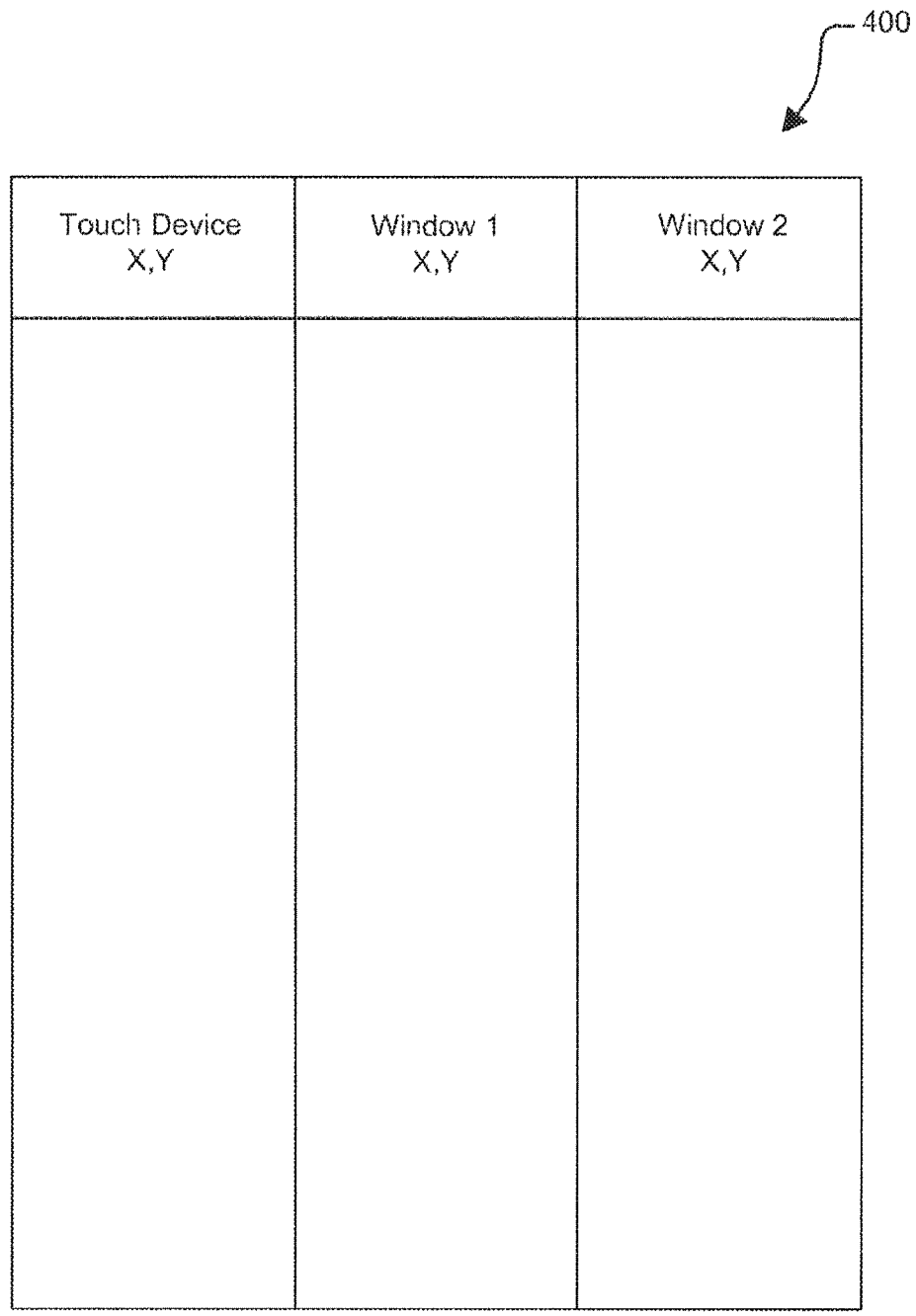
FIG. 4 is a diagram illustrating an exemplary coordinate mapping table.

FIG. 4 illustrates an exemplary table, generally designated 400 for mapping the X, Y coordinates of the touch device to display areas of the television. When a gesture is detected in the gesture area of the touch device, the coordinates of the gesture on the touch device can be mapped to the coordinates within an active display area on the television and the touch device can send an instruction to the television to perform an action at that location of the active display area. For example, a user could drag a finger across the gesture area to control a pointer on the television. The movement of the detected touch area through the coordinate space of the gesture area can be mapped to the display area and transmitted to the television so the movement can be replicated by the movement of the cursor. Thus, rather than moving through an array of icons on the television by moving left/right, up/down, the cursor can move in any direction including diagonally to more efficiently navigate to the desired icon. Alternately, a touch at a particular location on the gesture area can be translated to a corresponding location of the active display area. Thus, rather than moving a cursor around the display area to find a desired icon, the cursor or selection element can jump directly to an icon at the location corresponding to the location of touch, making the selection of the icon potentially more efficient.

Figure 5:
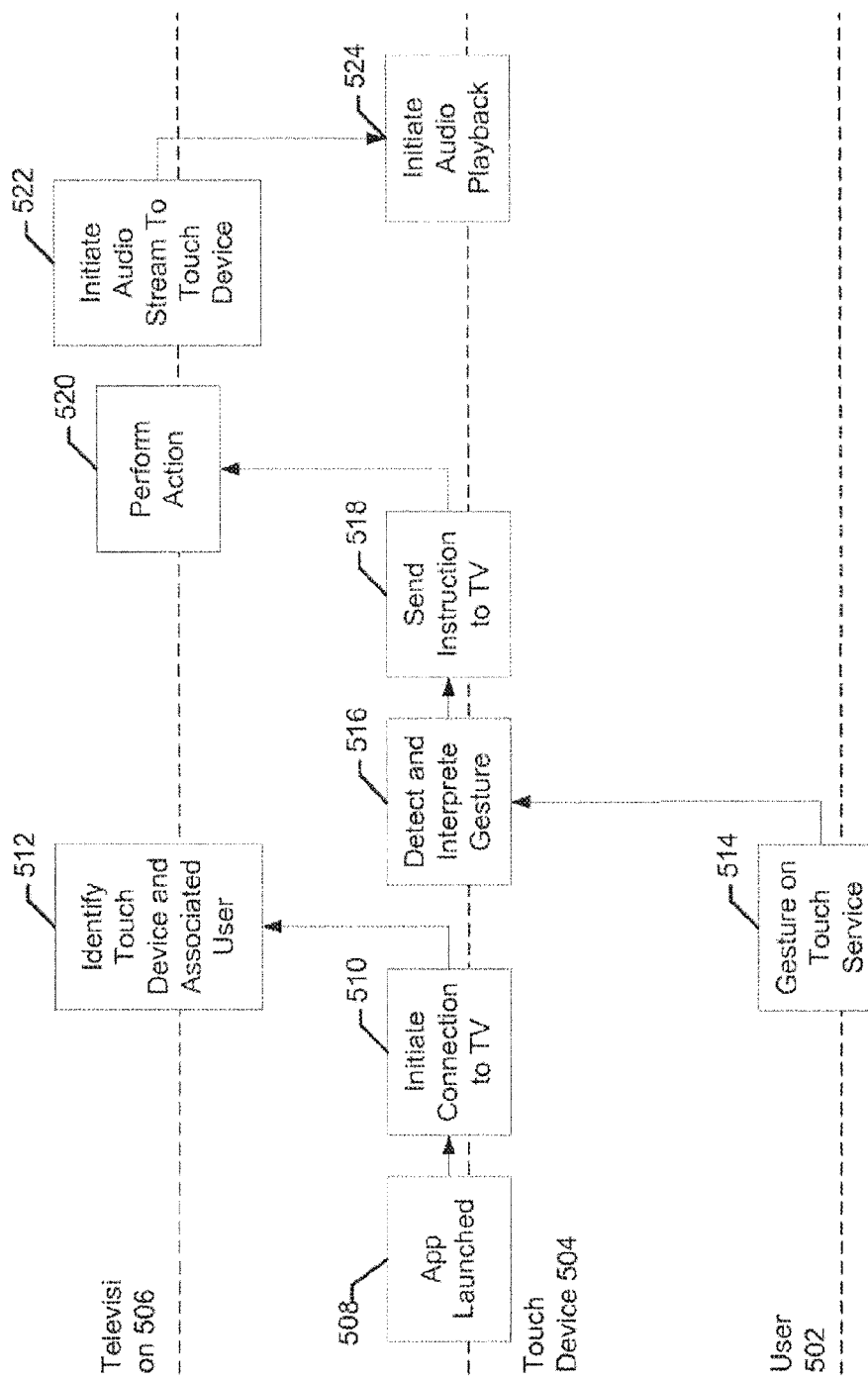
FIGS. 5, 6, 7, and 8 are flow diagrams illustrating exemplary methods of controlling a television remotely with a touch device.

FIG. 5 illustrates a flow diagram, generally designated 500, illustrating the interaction between a user 502, a touch device 504, and a smart television 506. At 508, an application for controlling the smart television can be launched on the touch device. Once launched, the application can initiate a connection to the television 506, as illustrated at 510. At 512, the television can identify the touch device and the associated user. In various embodiments, establishing the connection between the touch device and the television may require authentication of the touch device, which can be used to identify the touch device. Additionally, when a touch device is first paired with the television, a user account can be associated with the touch device. The user account can be used to maintain user specific settings, such as the arrangement of the display areas on the television display, relevant parental control limits, credentials for connecting to various online accounts, such as video-on-demand services like Hulu, Netflix, or the like, social media services, like Twitter, Facebook, or the like, cloud storage accounts like Dropbox, iCloud, Amazon Cloud Drive, or the like.

At 514, the user 502 can make a gesture on the touch sensitive display surface, such as in the gesture area or by touching a selection element. At 516, the touch device 504, can detect and interpret the gesture, and, at 518, the touch device 504 can send an instruction corresponding to the gesture to the television 506. In various embodiments, the gesture can have an associated gesture identity, such as determined by the pattern and relative movement of touches detected by the touch surface, and an associated location. Based on the associated gesture identify and location, the gesture can be interpreted by the touch device to represent one of a variety of commands. For example, a swipe of a finger to the right can be interpreted as a request for a summary of a show, while a swipe of a finger downward can be interpreted as a request for a television viewing guide. Additionally, multi-finger gestures, such as a pinch, may be interpreted as a request for zooming in or enlarging an image or display area. At 520, the television 506 can perform an action associated with the instruction.

At 522, the television 506 can initiate an audio stream to the touch device 504, and at 524, the touch device can provide playback of the audio stream, such as through a set of headphones. In various embodiments, the audio stream can be communicated from the television 506 to the touch device 504 via a Bluetooth connection, a Wi-Fi connection, an IR beam, an RF broadcast, or other various forms of digital or analog communications.

Figure 6:
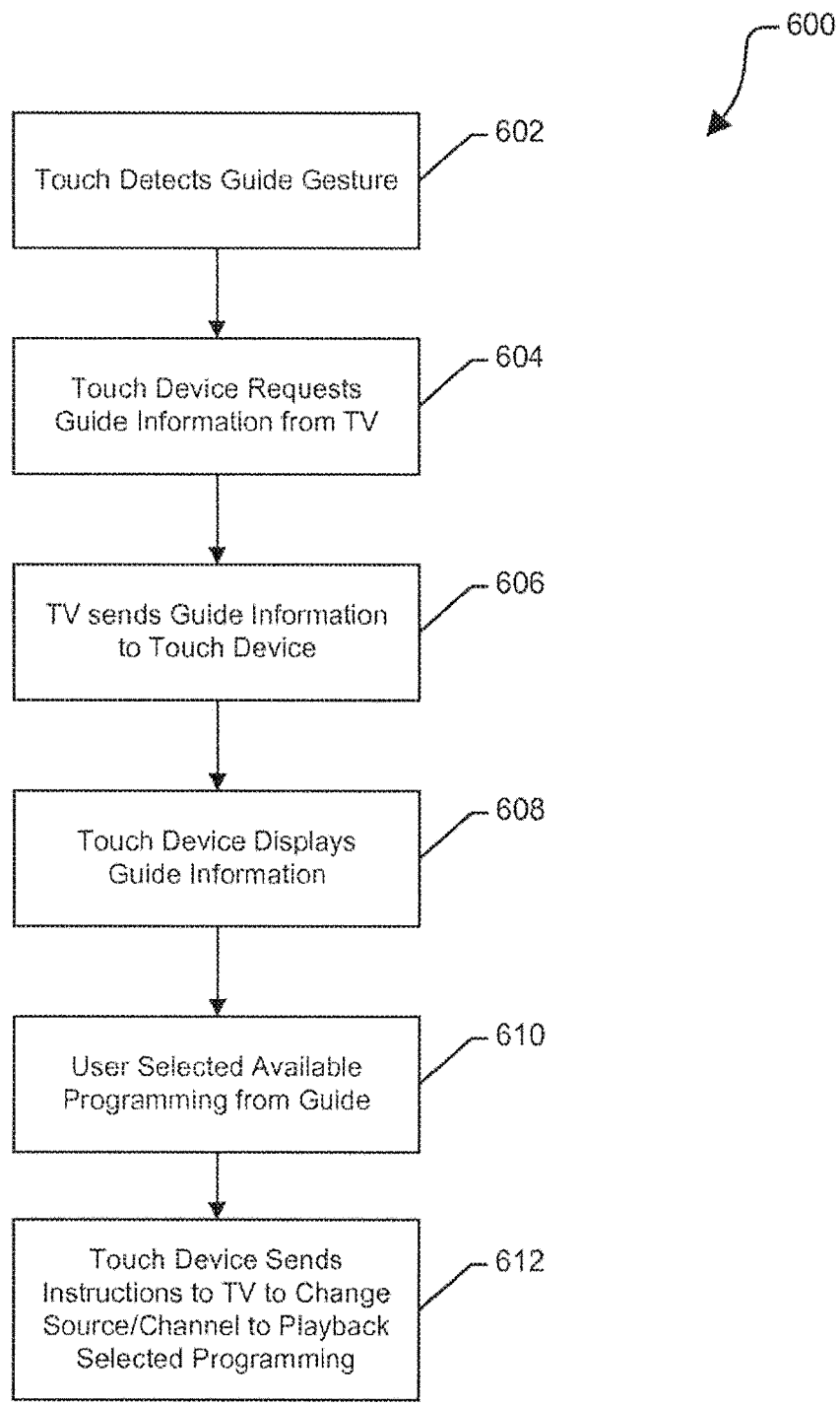

FIG. 6 illustrates a flow diagram of an exemplary method of controlling a television with a touch device, generally designated 600. At 602, the touch device can detect a guide gesture on the touch sensitive display. In various embodiments, the guide gesture may be a swipe of a finger, such as in a downward direction. At 604, the touch device can request guide information from the television, and at 606, the television can send the guide information to the touch device. In particular embodiments, the television may have access to information regarding currently available programming from a cable provider or from an over the air digital broadcast. In alternative embodiments, the touch device may retrieve the guide information independently from the television, such as directly from the cable provider via an internet connection.

At 608, the touch device can display the guide information on the touch sensitive display. The user may be able to scroll through or search the guide information to identify a particular content, channel, or content source, and the user can select available programming from the guide, as illustrated at 610, such as by tapping the content description in the guide. At 612, the touch device can send instructions to the television to change a source or channel to playback the selected programming. In alternate embodiments, the guide information may be displayed on the television, and the touch device may be used to scroll through and select the desired programming.

In various embodiments, the guide information can combine information from multiple content sources. For example, the guide information can include traditional guide information such as listing of channels and show times for various live programming. Additionally, the guide can include content from video-on-demand services offered by a cable provider or other video-on-demand content. The guide may also include various channels of content available through the internet, such as YouTube channels, internet radio channels, or the like. Combining information from various sources may improve the ability of the user to locate and identify desirable content.

Figure 7:
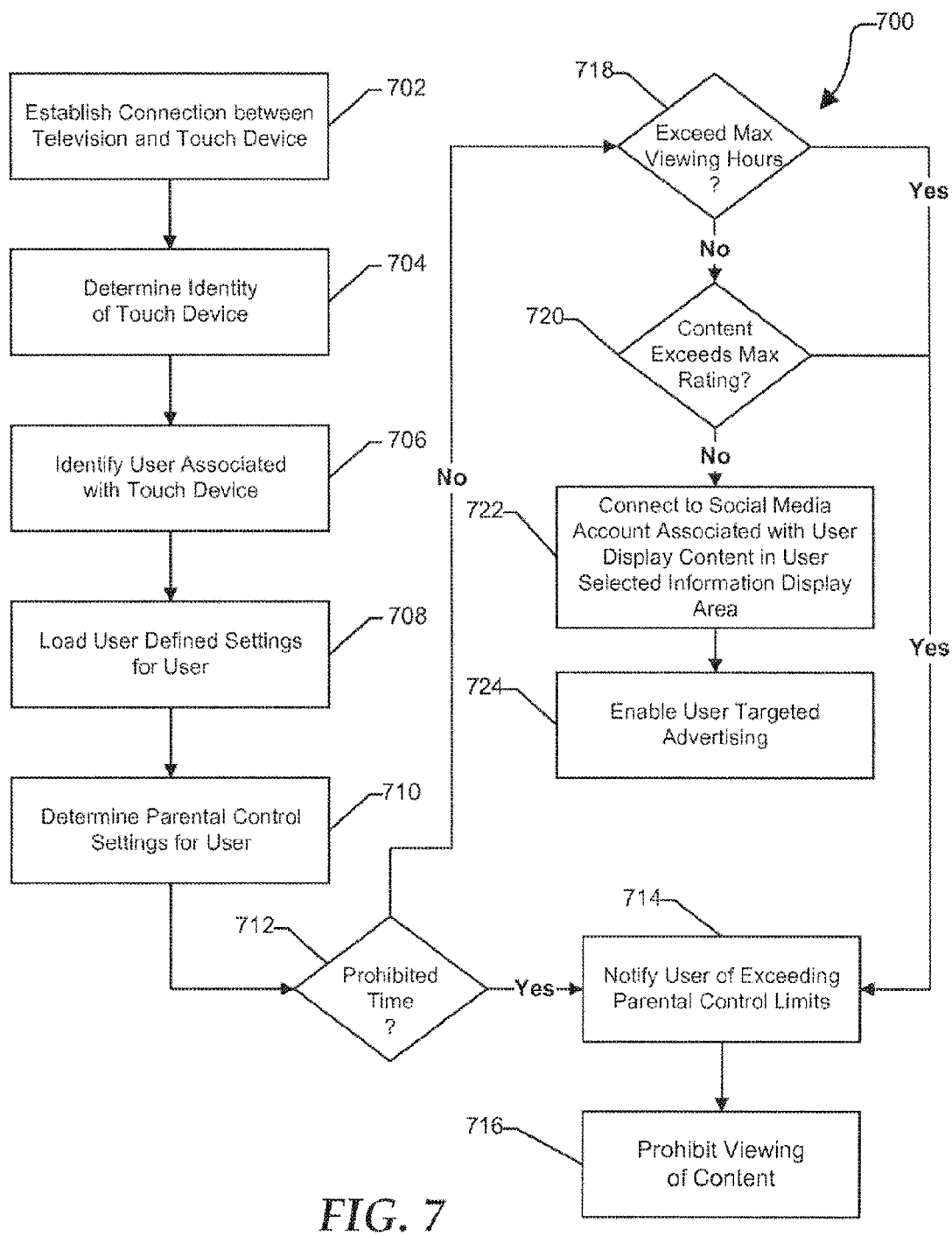

FIG. 7 illustrates a flow diagram of an exemplary method of providing a user specific experience for television viewing, generally designated 700. At 702, a connection is established between a touch device and a television. At 704, the identity of the touch device can be established. In various embodiments, the identity of the touch device may be established based on an authentication between the touch device and the television while establishing the connection. In alternative embodiments, the identity of the touch device may be determined based a unique identifier of the touch device, such as a MAC address, UDID (unique device identifier), or the like.

At 706, a user associated with the touch device can be identified based on the identity of the touch device. In various embodiments, when a touch device pairs with the television for the first time, the touch device can be associated with a user account on the television. The user account can be used for user specific settings, such as favorite channels, display layout, etc. The user account can also be used to maintain social media account credentials and to monitor and enforce parental control settings for the user. At 708, the user defined settings for the user associated with the touch device can be loaded, and at 710, parental control settings for the user can be determined.

At 712, a determination can be made if the user is attempting to view content on the television at a prohibited time. For example, the parental control settings may prohibit the user from watching television between the hours of 10 pm and 6 am. If the time is a prohibited time, the television can notify the user of a violation of the parental controls, as illustrated at 714, and prohibit the viewing of the content, as illustrated at 716.

Alternatively, when the time is not a prohibited time, or the parental controls have no prohibited time set, a destination can be made if the user is exceeding a maximum allowable number of viewing hours, as illustrated at 718. For example, the user may be limited to watching at most 2 hours of television a night during the week. When the maximum allowable number of viewing hours is exceeded, the television can notify the user of a violation of the parental controls, as illustrated at 714, and prohibit the viewing of the content, as illustrated at 716. In various embodiments, the television may notify the user when they are approaching the max allowable number of viewing hours, such as by notifying them five minutes before the limit is reached. This advanced warning can allow the user to save, pause, or quit a game, or stop playback of content on a device external to the television, such as a game console or DVD player.

Alternatively, when the maximum allowable number of viewing hours is not exceeded, or when no maximum allowable number of viewing hours is set for the user, a determination can be made if the rating of the content exceeds a maximum allowable rating, as illustrated at 720. For example, the user may be limited to viewing television content rated TV-PG or lower and movie content rated PG or lower. When the rating of the selected programming is higher than the maximum allowable rating, such as when the television content is rated TV-M or the movie content is rated R, the television can notify the user of a violation of the parental controls, as illustrated at 714, and prohibit the viewing of the content, as illustrated at 716.

Alternatively, when the content does not exceed the maximum allowable rating, or when no maximum allowable rating is set for the user, the television can connect to a social media account associated with the user and display information from the social media account in the user selected information display area, as illustrated at 722. Additionally, the television can enable user targeted advertising to select advertising specific to the user, as illustrated at 724.

Figure 8:
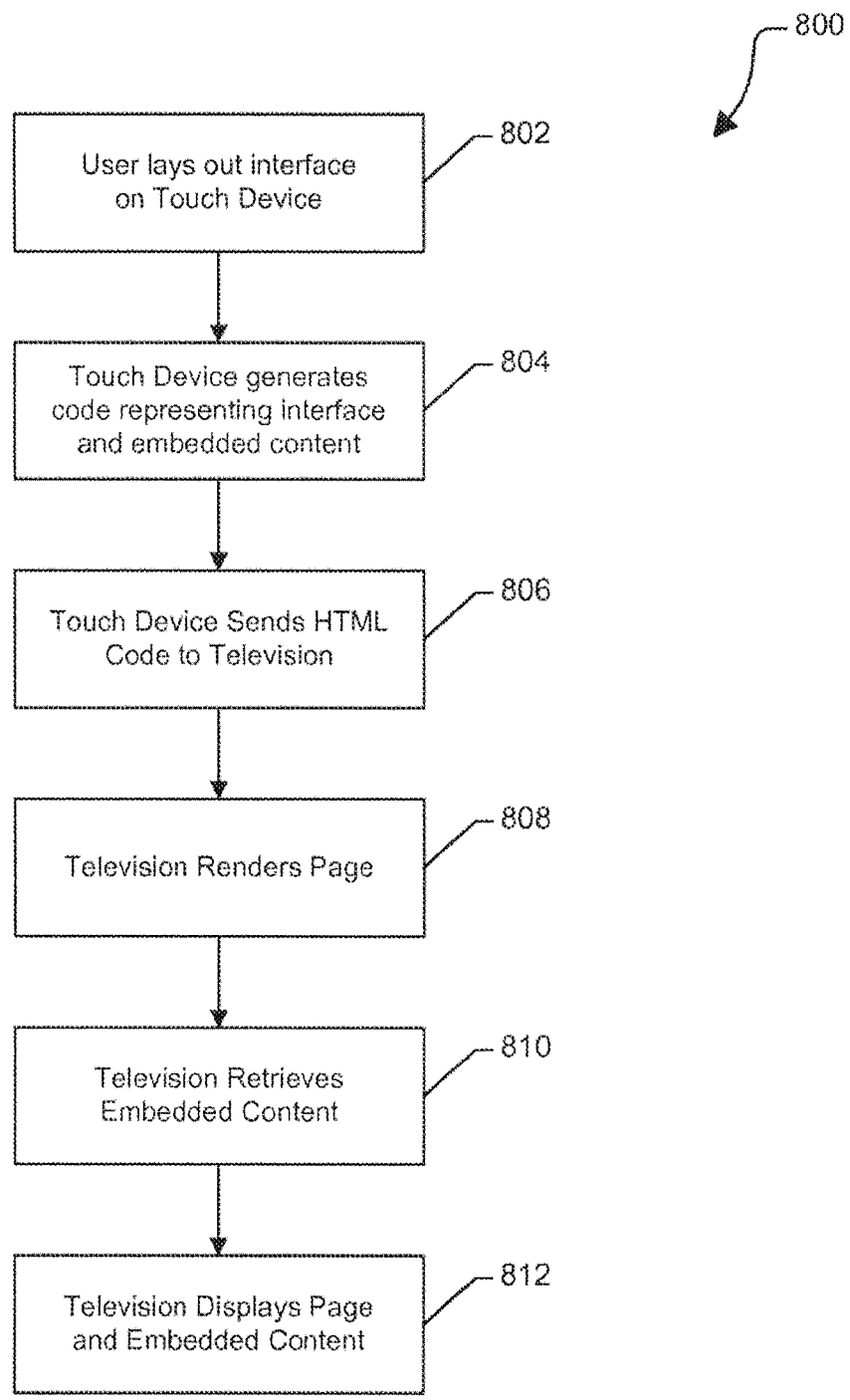

FIG. 8 illustrates a flow diagram of an exemplary method of displaying content in a user defined layout, generally designated 800. At 802, a user can layout an interface on the touch device. In various embodiments, the user can define one or more display areas or windows, adjust the size and arrangement of the display areas, and define the content to be embedded in each display area. For example, a first display area can designated for displaying a streaming video feed of a sporting event and be pinned to the upper left corner, a second display area can be designated for displaying a group text feed and be pinned to the right side, and a third display area can be designated for displaying living stats from the sporting event and can be pinned to the bottom of the display. The user can adjust the aspect ratio of the first display area, such as by selecting between 16:9, 4:3, 1.85:1, 2.35:1, or other aspect ratios. Additionally, the user may adjust the relative sizes of the first, second, and third display areas.

At 804, when the layout is complete, the touch device can generate code describing the layout. For example, the code can be HTML 5 code describing the arrangement of the display areas, and embedding links for the content to be displayed within those areas. In various embodiments, video content from various inputs to the television could be addressed using a modified URL. For example, rather than the URL directing to a web server for the content, the URL could direct the TV to the antenna and have a channel parameter, such as, for example, antenna:///channel_5. Alternatively, the television could address the various inputs similar to the way a URL can access a local file on a computer, such as, for example, file:///HDMI1 or file:///antenna/ch5.

At 806, the code can be sent to the television, and at 808, the television can processes the code, rendering the interface. The television can retrieve the embedded content for each display area from the appropriate source, as indicated at 810, and can display the embedded content within the appropriate display area on the television screen, as indicated at 812. In some embodiments, displayed content may include a selectable item and/or selectable area that is linked to additional information. For example, a video displayed in one window or display area may include an advertisement and/or an element of the video that a user wants to know more about. A user then may be able to utilize a touch device application in trackpad mode to mouse over and select the advertisement or video element. Such a selection may be recognized as a request for more information. The additional information may be retrieved and used to populate one of the display areas of the defined layout. Depending on implementation detail, the television and/or the smartphone or tablet may retrieve the additional information. With reference to the example interface in FIG. 9, a user may select a scoreboard presented in the college football game rendered in Window 1. That selection may cause Window 3 to appear and to be populated with a scrolling list of scores for other college football games. In such an embodiment, the user may have pre-defined Window 3 as a springing window that "springs" into existence when a user indicates an interest in some element then appearing in Window 1 and/or Window 2. In some cases, the springing window may remain until a user indicates a desire to have it deleted and/or it may stay for some pre-defined amount of time.

The application may include several different modes. For example, the application may be operable in a stand-alone mode in which the smartphone or tablet presents a customized video layout on its own display. The application may also be operable in a trackpad mode. In some cases, the application may enter a trackpad mode in connection with a user "throwing" the customized video layout to a television. The application may also be operable in a textual input mode. In some cases, the application may enter the textual input mode when the application recognizes that a user has selected a display area that requires or allows typing. For example, if one of the display areas of the layout includes a social media feed (e.g., a group text feed), the application may recognize a user's "mouse"-ing over and selecting that portion of the layout as a desire to type a message. In such a system, in various embodiments, selecting the social media feed window may cause Window 3 to spring into existence and to allow the user to type, edit, modify, etc. a message before adding it to the social media feed. It will be apparent to those skilled in the art that a designer may choose to utilize a quasi-mirroring technique when throwing a my television display area to a television. For example, when the application is in standalone mode, the image presented on the tablet application may look nearly identical to the image on the television (if the display area is thrown to the television.) However, when the application enters trackpad mode and/or textual input mode, the image then presented on the tablet application may look nothing like the image displayed on the television.

Figure 9:
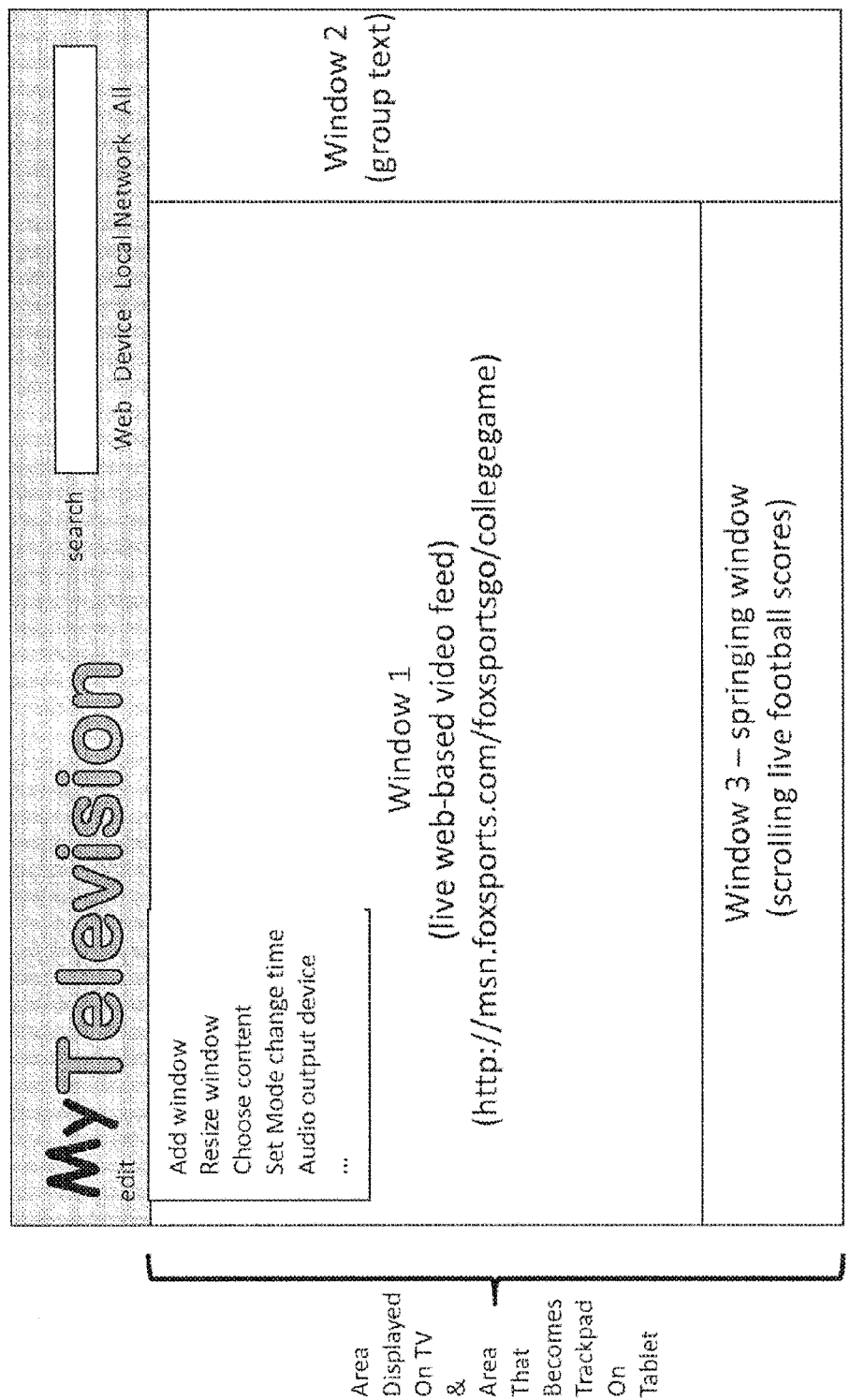
FIG. 9 depicts one example of a graphical user interface for an application incorporating teachings of the present disclosure.

As such, the image depicted in FIG. 9 may be one presented on a tablet application and/or a computer accessing a cloud-based service and creating a customized my television display. As shown, the GUI may allow a user to search the web, a local device memory, a local network of devices, etc. for content that can be used to populate a window. In addition, more or less windows could be included. Each of the windows could be implemented as re-sizeable windows. One or more of the windows may be designed as springing windows that do not always appear in the display area when the application is in use but rather spring into being in response to some triggering event. Various features of the display area may be edited. For example, a user may be able to toggle between the television and the tablet as the outputting device for audio. In various embodiments, the two or more windows may display video content, each with an associated audio stream. When multiple audio streams are present, the television may output audio from one audio stream and the tablet may output audio from a different audio stream.

In some instances, the media selected for presentation within a given media viewing window may be content delivered using some sort of adaptive bit rate technology such as Smooth Streaming, HTTP Live Streaming (HLS), HTTP Dynamic Streaming (HDS), UpLynk, QuavStreams, MPEG DASH, etc. This may be true for video, audio, etc. For example, a selected video may be deliverable using Smooth Streaming by Microsoft, which is an implementation of adaptive bitrate streaming technology. This delivery option represents a form of Web-based media content delivery that uses HTTP. Instead of delivering media as full-file download, or as a persistent and stateful stream, the content may be delivered to clients as a series of MPEG-4 (MP4) chunks or fragments that can be cached at edge servers. In practice, a selection of content may be broken into several sequential fragments. Typically, these sequential fragments will represent a given amount of time (e.g., two seconds of content, five seconds of content, ten seconds of content, etc.). In addition, for each sequential fragment, there may be several quality levels or profiles available. For example, a network may be storing three files representing the first five seconds of a movie. One of the three files may be low quality, one may be mid-quality, and one may be high quality. In practice, a client device may request the highest quality it thinks it can receive and render to a user without stuttering, freezing, etc.

A Smooth Streaming-compatible client incorporating teachings of the present disclosure can be implemented to use heuristics to monitor current device and/or network conditions. In many cases, the client can switch the video quality of the presentation to account for the circumstances detected at the device (e.g., buffer fill) and/or network condition. As a client is playing one fragment representing a first sequential chunk, network conditions may change, and the client can issue a request for a subsequent fragment that is encoded at a different bit rate. This helps the client to play the highest quality media available without stuttering, buffering, or freezing.

On the delivery and media preparation side, encoders can convert prerecorded or live media into the aforementioned sequential chunks or fragments of media. For a given chunk (e.g., the first portion of the media), the content may be encoded at several different quality levels. As such, there may be a Fragment1-low quality chunk, a Fragment1-mid quality chunk, a Fragment1-high quality chunk, a Fragment2-low quality chunk, etc. The encoded media file chunks may be available from a network and a manifest or playlist may be created that provides an indication of how to request a given chunk from the network. In some cases, media may be pre-encoded and stored such that each video fragment is offered in several different profiles and the location of each profile of each fragment is included in the manifest. In practice, a client may use the manifest to identify a URI for a desired fragment and may utilize HTTP to request that fragment.

In some cases, different servers may be streaming the media at different quality levels in a way that marks the different sequential fragments within the stream to allow a client to request one chunk from a high quality stream and a sequential chunk from a different quality stream. In some cases, the manifest may include addresses that are translatable in a way that allows a given request from a client to be understood as a request for a marked fragment from within a live stream and a next request as a request for a sequential fragment from within a different live stream.

As mentioned above, adaptive rate technologies can use HTTP to take advantage of the scale of existing HTTP networks, which may allow content producers and distributors to keep content closer to the audience. Unlike traditional streaming, adaptive streaming can use standard HTTP to deliver cacheable MPEG-4 (MP4) fragments, which may help eliminate the need for provisioning a streaming server network with the required number of stateful streaming sessions. As a result, two remotely located clients may request the same content, and the content may be delivered from two different edge servers that are unaware of one another.

In practice, when a client makes a request for an adaptively streamed media, a Web server may deliver a manifest (which may be an XML document) that describes the available profiles or quality levels and where they are located. A given client can then consider the manifest and use some appropriate heuristic(s) (e.g., buffer fill, network latency, etc.) to determine the right file to request in order to receive a subsequent chunk of media at an appropriate quality level in time to facilitate a seamless presentation of the content to a user. In some systems, the manifest may contain URIs and names in their unobfuscated form. The system could use several types of files (e.g., .ismc, .isma, PIFF, .m3ub, .ts, etc.). The file name of the client manifest file could match the file name of the server manifest. In some systems, the manifest may contain modified locators, translated locators, etc.

Figure 10:
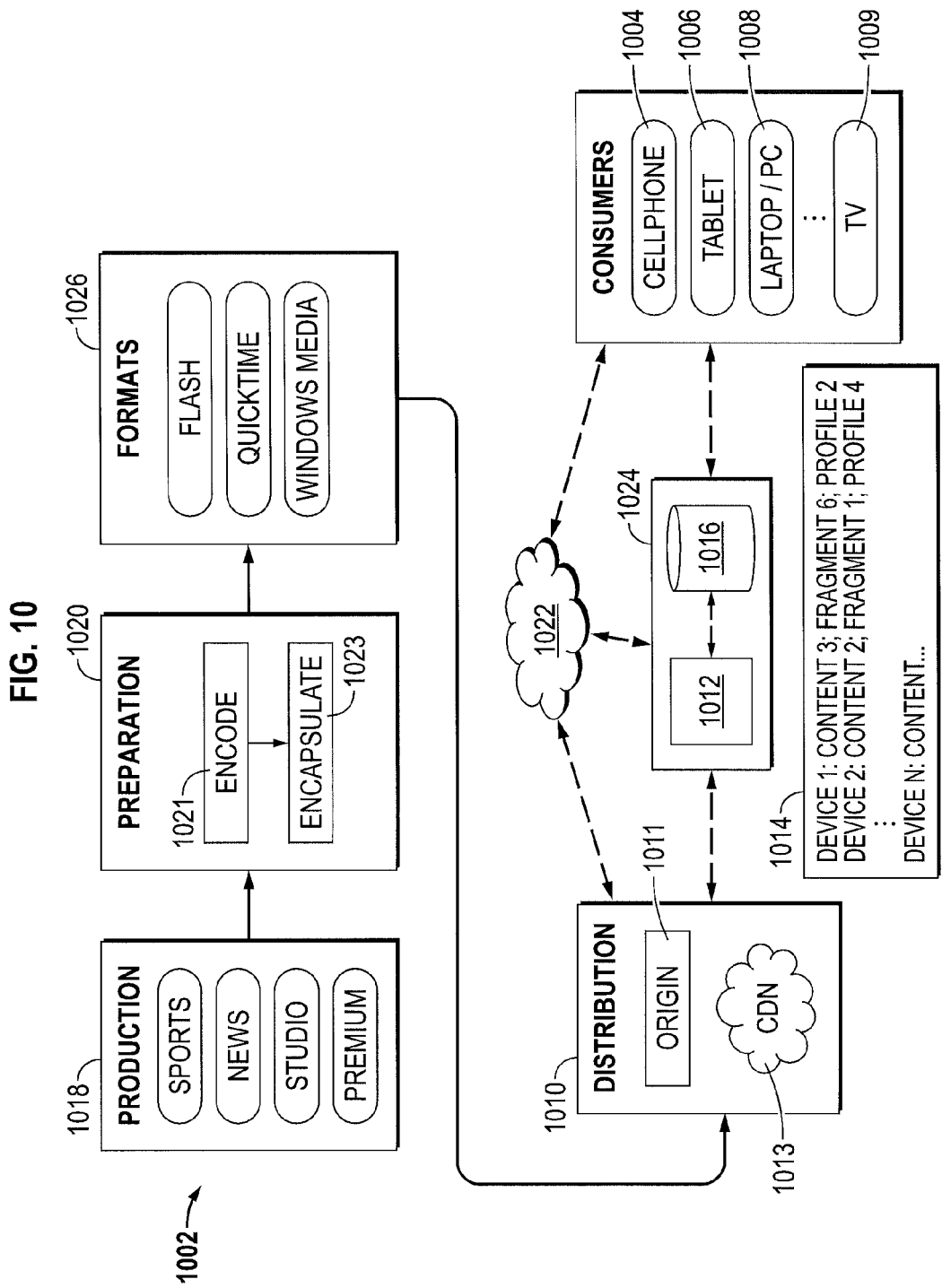
FIG. 10 depicts one example of a system incorporating teachings of the present disclosure to deliver media to a touch device executing an application.

In the system 1002 depicted in FIG. 10, there may be two or more clients (1004, 1006, 1008, 1009, . . . N) that are remotely located from one another and configured to facilitate the consumption of media content. These clients may be an application executing on a consuming electronic device. As shown, these consuming devices 1004, 1006, 1008, 1009 may be cellular telephones, tablets, laptops, personal computers, televisions, set top boxes, etc. Moreover, these consuming devices may be capable of communicating with other devices. As such, a tablet may be requesting content and then communicating a representation of the received content to a television or set top box. In practice, the tablet and the television or set top box may be connected to the same local area network, and this connection may facilitate the sharing of information.

In FIG. 10, clients 1004, 1006, 1008, 1009, etc. are depicted as being remote from one another. Despite their geographic separation, the users of the clients may want to enjoy the same media at the same time. If the media is, for example, a video-on-demand media that is pre-recorded and stored in and/or available via a network 1010, the depicted system 1002 may incorporate teachings of the present disclosure to facilitate simultaneous or near-simultaneous viewing even if the viewing clients are remotely located from one another and receiving content from different distribution nodes. As shown, the distribution network 1010 may include several different components. These components could work independently and/or in concert with one another and could include, for example, one or more origin servers 1011 and content delivery networks (CDNs) 1013 like the ones operated by Akamai or Limelight.

In some cases, users of an application like the one described in connection with FIG. 9 may want to share a viewing experience with another user of a similar application. For example, a service provider may have a computing resource connected to the Internet that "talks" with the applications executing on the user devices. The computing resource may be designed to keep track and/or to take note of where in a video stream the users are. As such, the computing resource could help ensure that the two or more people watching the same video are watching it at the same time. It could also allow one person watch a video and mark (with gestures, a button, or some other object or action) an interesting part or point in the video. Using the computing resource, one person can send a message inviting a friend to watch a video. The message could include information that tells the computing resource where the interesting (or good) parts of the video are. This information could allow the friend to watch the entire video if he or she wants to. If the friend does not want to view the whole video, the friend can skip of fast-forward from one good part to another good part.

In practice, network resource 1012 (which may be a server, a special purpose computer, a general purpose computer, and/or a computing platform executing instructions) may maintain a table of information 1014 that contains one or more pieces of information related to media requested and/or being consumed by one or more of clients 1004, 1006, etc. The information could include, for example, a device identifier, a client identifier and/or a user identifier. Maintained information may be stored as one collection of information, stored as independent collections of information, or stored in some other appropriate way. Depending on implementation details, the maintained information could include more or less than three pieces of information. For example, table 1014 may also include an identification of a media requested by and/or being received by a given client. In situations where the media is available via an adaptive bitrate streaming delivery, table 1014 may also maintain a fragment identifier that describes which portion of the media the client is accessing, will access, or has accessed as well as a profile descriptor that may indicate various encoding parameters of the fragment.

In some cases, network resource 1012 may recognize that two different clients have indicated a desire to consume the same content at or near the same time. In such cases, network resource 1012 may access storage system 1016, which may be maintaining a copy and/or an instance of table 1014. Network resource 1012 may use information maintained in table 1014 to facilitate a synchronizing or near-synchronizing of the content being consumed by the two remotely located clients desiring such synchronicity. In practice, one client may have recently requested fragment twenty while the other client has only requested fragment one. For example, client 1004 may have communicated a message to client 1008 asking if client 1008 wants to simultaneously watch video content A. In practice, resource 1012 may include or be communicatively associated with a messaging platform that facilitates communication between client 1008 and client 1004. The platform could be, for example, an SMS platform, a chat platform, a voice communication platform, an email platform, some other communication platform, and/or some combination thereof. In the example introduced above, client 1008 may also want to watch the content but may have started at some point after client 1004 began watching. In such a circumstance, network resource 1012 may recognize the time lag and initiate communication of a message to client 1008 that tells client 1008 to move forward to fragment twenty to bring the two remote devices into a synchronized viewing experience. The move forward could be, for example, a skipping ahead, a fast-forwarding ahead, and/or some other designer-preferred approach. In addition, a designer could also elect to have the client that is ahead rewind to help bring the two clients into sync, to enter a slow motion period or to pause to allow the client that is behind to catch up, and/or some other or combination of techniques to help synchronize the clients. In addition, the number of clients being "synchronized" could be two or more.

Depending upon implementation details, network resource 1012, which may be a collection of computing resources and/or the backend of an app-centric service provider, may be capable of helping to populate table 1014 by collecting fragment and/or other information from a component of distribution network 1010, a component operating at one or more of the clients 1004, 1006, 1008, some other resource aware of which fragment a given client is requesting, and/or some combination of these. In one example solution implementing teachings of the present disclosure, each of several hundreds or thousands of clients may be executing a local application and/or a collection of code that facilitates both messaging and media consumption. These clients may want to watch a video at the same time. It should be understood that "at the same time" does not necessarily mean perfectly synchronized. "At the same time" or the term "synchronized" also includes near-synchronicity, which may include a minute or more of content timing disparity between a pair of clients. The application and/or code executing on the many remotely located devices may be implemented in a manner that facilitates a communication of information to network resource 1012 that provides an indication of where within a given media stream a given client is. This information may, for example, be used to help populate table 1014 and may help resource 1012 bring the many clients into sync. In operation, resource 1012 may access table 1014, may recognize that the media being rendered at various of the remote devices needs to be slowed down, sped up, and/or modified in some way to create synchronized viewing, and may communicate with one or more clients to facilitate the desired synching.

A given application and/or collection of code may provide additional functionalities as well. For example, one instance of an application may allow a user to indicate where within a selection of media a given event occurs. By way of example, a user may be watching a thirty minute video and notice a particularly interesting moment within the video. The user may utilize a given feature of the application (such as a selectable icon and/or a gesture for tagging a moment in the content) to indicate that the interesting moment occurs between a point fifteen minutes and thirty seconds into the video and sixteen minutes and ten seconds into the video. In practice, the user may tag the content while the user is watching it and may add multiple indicators of interesting content points within the video. The application may share these indicators with resource 1012, another client, and/or some other resource. For example, resource 1012, a given application executing at a client, table 1014, and/or some other component of system 1002 may maintain information that indicates which fragment(s) of an adaptive bitrate stream are the ones that include the interesting points within the entirety of the content. With this information, a client, like client 1004, may be able to send a message to another client, like client 1008, that invites a user of client 1008 to access and consume a given piece of content. The message may also include information that allows client 1008 and/or some other device to "know" which specific fragments of the adaptive bitrate stream include content that has been identified as particularly interesting. As such, client 1008 may be capable of requesting and/or rendering the portions identified as interesting without forcing the user to consume an entire thirty-minute piece of content if only thirty seconds of the content is really worth consuming. In some implementations, a rendering window of an application executing at client 1008 may be presenting video content. The application may provide different ways and/or options for video consumption. For example, the application may allow a user: (1) to watch the entire thirty-minute video at a regular presentation rate with or without indicating which portions the user of client 1004 thought were interesting; (2) to move from tagged portion to tagged portion while skipping or fast forwarding through most of the content and only watching the interesting portions at a regular presentation rate; (3) to only be presented with the interesting portions, and/or (4) to consume the video using some other viewing methodology and/or a combination of viewing methodologies.

While much of the above discussion focuses on applications executing on remote client devices and the ways in which these applications may be able to work together, system 1002 includes several other components and features. As depicted, system 1002 includes a media production system 1018 and a media preparation system 1020, which may facilitate the conversion of media content from a recorded format to a presentation format such as Flash, QuickTime, Windows Media, etc. In practice, a production facility may produce a video representing a sporting event, a news report, some studio production, and/or some form of premium video content. The video from system 1018 may be communicated to system 1020, which may take the video and perform multiple bitrate encoding on it to produce fragments and/or streams encoded (block 1021) at different bitrates to facilitate adaptive bitrate streaming delivery to a client. The video may also be encapsulated (block 1023) and placed into one or more of several web presentation formats (block 1026) like Flash and QuickTime. Encoded video may be made available to a distribution network or resource like 1010. Distribution network 1010 may maintain video on demand content and a manifest for the content within the network. For live or near live content, network 1010 may maintain a manifest for the live content and may be configured to deliver various encoded versions of the live or near live content. As such, network 1010 may be able to facilitate the delivery of adaptive bitrate streams for either video on demand or live content. In practice, client devices may communicate (indicated generally at 1022) with network 1010. A client may request media content, a manifest for the content may be communicated to the client, and the client may issue HTTP requests for sequential fragments having the same or different encoding profiles, and those fragments may be delivered in a just-in-time like manner.

And as discussed above, the addition of content sharing resource 1024, which may include resource 1012 and storage system 1016, may allow system 1002 to sniff or listen to the various HTTP requests, to populate a table like table 1014, and to use this information to provide users with various sharing features such as a remote synchronized viewing feature and a shared content tagging feature described.

As mentioned above, FIG. 11 presents a generalized diagram for a system 1102 incorporating teachings of the present disclosure to help facilitate the synchronizing of a selection of media content being consumed by multiple users. In practice, a user of device 1104, which may be operating in a home 1106 may communicate a message to users of device 1108 and device 1110. As depicted, device 1108 may be located at a home 1112, and device 1110 may be located at a home 1116. As such, the devices may not be connected to the same local area network. The message sent from device 1104 may represent an invitation to remotely while near simultaneously consume a media such as a video on demand. In practice, the message may be communicated via a messaging platform 1118 provided by a network connected service provider. The messaging platform 1118 may be part of a remotely located services platform 1120 that offers several different services to remote devices like devices 1104, 1108, and 1110. These services may include voice, video, and/or text messaging, media discovery and delivery, viewing template design and distribution, advertising, shopping, etc.

Figure 11:
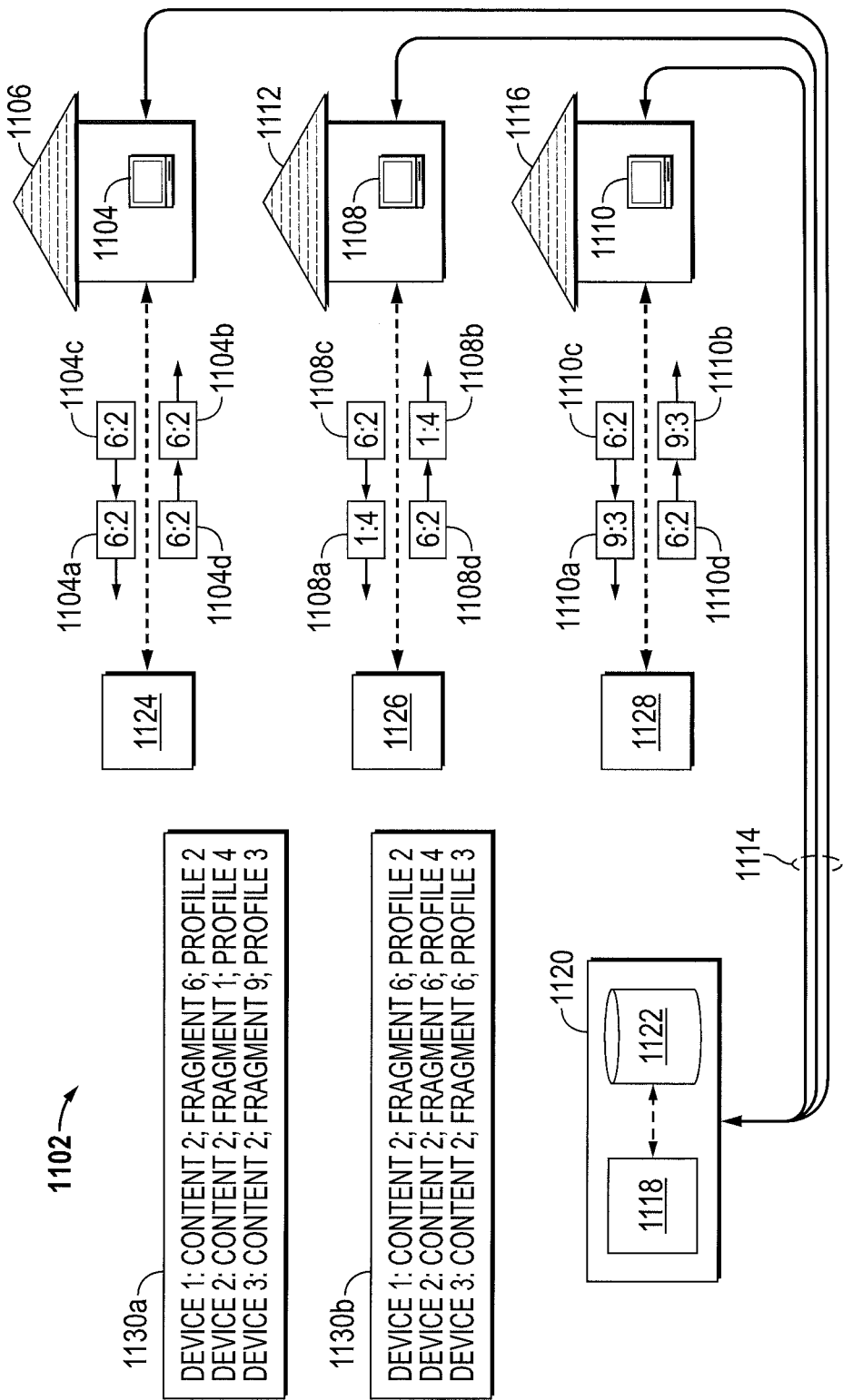
FIG. 11 depicts one example of a system incorporating teachings of the present disclosure to facilitate synchronized delivery of a media to a plurality of touch devices utilizing their own instances of an application.

In practice, services platform 1120 may be part of an app-centric media delivery and discovery network that includes several remote instances of an application working with platform 1120. Some of the applications included in this network may be executing at devices 1104, 1108, and 1110 and may be similar to the application described above in connection with FIG. 9. Though FIG. 11 depicts only three devices and a platform having a messaging platform 1118 with one server and a connected memory system 1122, designers will recognize that this is illustrative and that an app-centric media delivery and discovery network incorporating the teachings disclosed herein could include hundreds, thousands, millions, etc. of application instances and a distributed services platform with many servers and storage devices.

As shown, an instance of an application like the one described in connection with FIG. 9 may be executing at device 1104 and may facilitate discovery of a given video on demand and the issuance of a "let's watch this video" message to similar applications executing on devices 1108 and 1110. In practice, the devices may communicate (as shown generally a 1114) with one another using platform 1118. As shown, each of devices 1104, 1108, and 1110 have elected to watch the video. However, the devices are out of synch as indicated by HTTP requests 1104a, 1108a, and 1110a. As shown, these requests have been routed to edge servers 1124, 1126, and 1128 (which may be separate edge servers included in a given content delivery network). In response to the requests, the edge servers have responded by communicating the requested fragments to the requesting devices (indicated generally at 1104b, 1108b, and 1110b). As shown, device 1104 has requested fragment 6 with a 2 profile, device 1108 has requested fragment 1 with a 4 profile, and device 1110 has requested fragment 9 with a 3 profile.

In practice, each of the devices 1104, 1108, and 1110 may have initially utilized HTTP to download a Manifest file with metadata about the desired video on demand stream. This Manifest may have contained the location of the actual media, including multiple different profiles for each fragment (e.g., profiles with different bitrates and/or resolutions and/or languages and/or separate audio or subtitle streams or any other different type of variant). In practice, the manifest might also include the location of additional metadata or sub-Manifests that provide more information about a specific variant.

As mentioned above, the actual media may be split into fragments of a specific size, such as 2 seconds to 10 seconds, and may be receivable from a CDN server. Depending on the actual protocol, the separate fragments may be played standalone or need additional information from the Manifest. The actual media often has a container format like MPEG TS or a variant of ISO MP4. As shown, the three devices are initially out of synch. In practice, the applications executing at devices 1104, 1108, and 1110 may communicate messages to services platform 1120. These messages may indicate where in a given media stream each client is. This information may be stored for some period of time in table 1130a, which may be stored in memory system 1122. As indicated in FIG. 11, services platform 1120 may utilize table 1130a and recognize the devices that want to watch the video at the same time are currently out of sync. In practice, services platform 1120 may determine how long each fragment is (e.g., a two second fragment or a ten second fragment.) Platform 1120 may be designed to allow a certain amount of time disparity between viewing clients (e.g., one second, five seconds, ten seconds, thirty seconds, one minute, five minutes, etc.) Platform 1120 may use the understood length of a given segment to determine if the type discrepancy is less than a defined limit or greater than a defined limit. If the discrepancy is greater than some defined limit, platform 1120 may send a message to each of devices 1104, 1108, and 1110. The messages may "tell" the devices to change their place in the Video's manifest to facilitate a synchronization of the streams. As indicated by HTTP requests 1104c, 1108c, and 1110c, devices 1104, 1108, and 1110 have all moved to fragment 6 in their respective manifests and issued requests for fragment 6.

As shown, the devices have also moved to the same profile, profile 2. Depending on designer preferences, the message from platform 1120 may suggest a specific profile. In some cases, platform 1120 may suggest, a given location in the manifest while allowing each client to use some set of heuristics to determine which profile to request. As indicated by delivered information 1104d, 1108d, and 1110d, devices 1104, and 1108, and 1110 appear to be more closely synchronized, and table 1130b has been updated to show the more recent fragment request state of each device.

It should also be noted that platform 1120 may allow for the existence of one or more "controlling clients" during a synchronized viewing session. For example, device 1104 in FIG. 11 may be in a state of controlling the video being consumed by the collection of devices. As such, a user of device 1104 may be fast-forwarding, rewinding, etc. the video and platform 1120 may be facilitating the user's ability to control presentation on behalf of device 1104 as well as devices 1108 and 1110 despite the fact that devices 1108 and 1110 are receiving their video feeds from CDN nodes that are not the same as the node servicing device 1104. As such, platform 1120 may "know" that a subset of devices want to watch a synchronized video. Platform 1120 may also "know" when one or more of the subset of devices is taking control. The process of letting platform 1120 "know" these things may be built into an application like the one described in connection with FIG. 9. For example, such an application may provide an icon, allow for the communication of messages, recognize a gesture, etc. as a mechanism for letting platform 1120 "know" if synchronization and/or control is desired.

Figure 12:
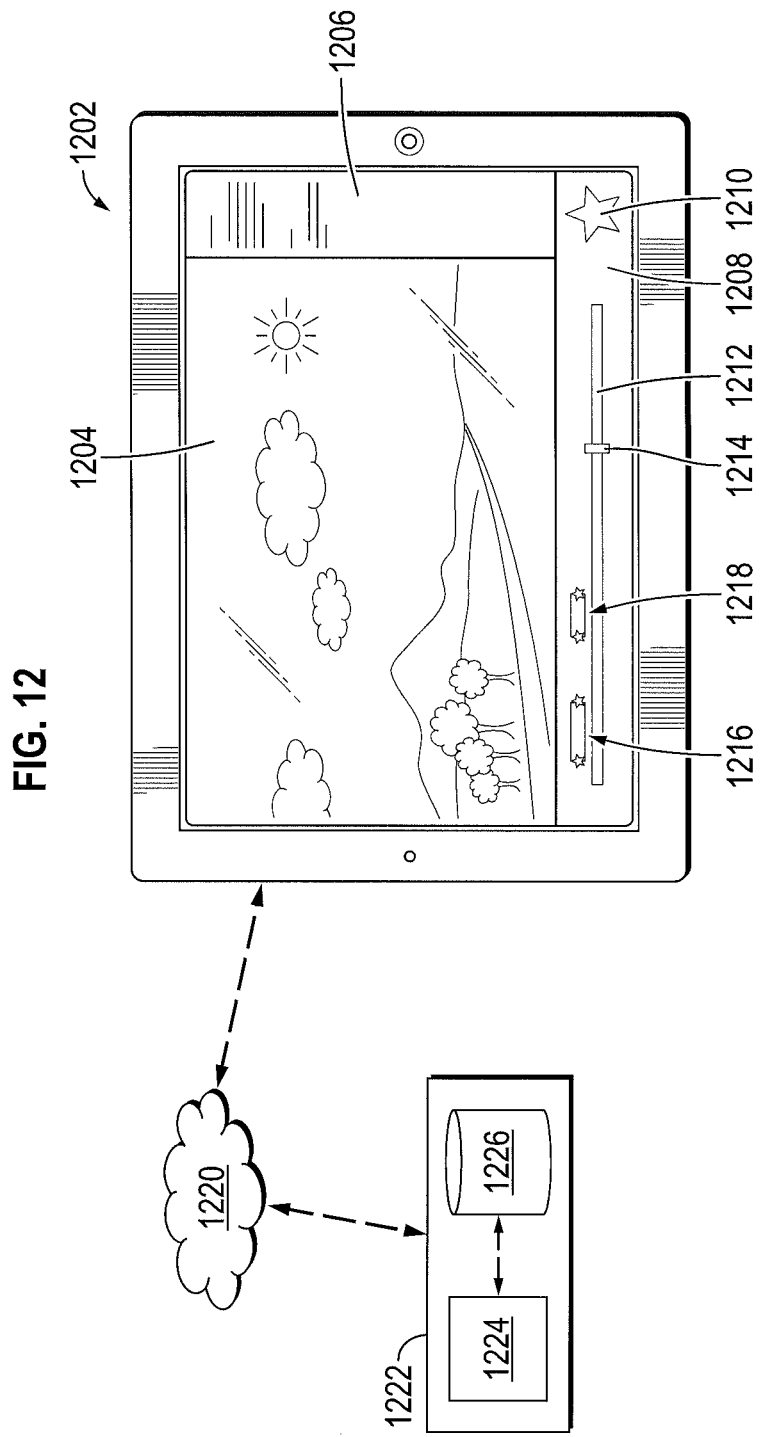
FIG. 12 depicts one example of a system incorporating teachings of the present disclosure to facilitate the identifying of certain portions of a media and the sharing of the identified portions with a plurality of touch devices utilizing multiple instances of an application.

As mentioned above, FIG. 12 depicts a system 1200 that facilitates a user's ability to tag or mark interesting parts of a given media. In practice, an application like the one discussed in connection with FIG. 9 may be executing on a device 1202 that may have a touch sensitive display. The application may present a graphical user interface with multiple viewing panes and icons. As shown, pane 1204 may be presenting a video, pane 1206 may facilitate the sending of messages, and pane 1208 may include a tagging feature. As depicted, a user may watch a video and tag interesting portions of the video using the tagging feature. FIG. 12 shows star icon 1210, a video progress bar 1212, and a current location in the video indicator 1214. The depiction also indicates previously ragged portions 1216 and 1218.

In practice, a user tagging a given video may be watching the video and press the star icon when an interesting portion begins and press the icon again when the interesting portion ends. The user may tag multiple portions of the video as indicated by tagged portion indicators 1216 and 1218. Other forms of gestures or icons could be used, and the star is just shown as an illustrative example. In practice, metadata for the video may be maintained that includes the "interesting content" location identifiers. For example, in a media available as an adaptive bitrate video stream, a manifest file may be maintained. The manifest file may include fragment URI's as well as metadata. The "interesting content" location identifying metadata may be included in a manifest for the content and may identify which fragments include the "interesting content".

As shown, a user of device 1202 may be tagging content and adding portion indicators 1216 and 1218 as he or she watches the video. In practice, information including some fragment identifying information associated with indicators 1216 and 1218 may be communicated via a network 1220 to a service platform 1222.

In practice, services platform 1222 may be similar to platform 1120 of FIG. 11 and may be part of an app-centric media delivery and discovery network that includes several remote instances of an application working with platform 1222. Some of the applications included in this network may be executing at remote devices like device 1202. Though FIG. 12 depicts only one device 1202 and a services platform 1222 with a messaging platform 1224 with one server and a connected memory system 1226, designers will recognize that an app-centric media delivery and discovery network incorporating the teachings disclosed herein could include hundreds, thousands, millions, etc. of application instances and a distributed services platform with many servers and storage devices.

As shown, an instance of an application like the one described in connection with FIG. 9 may be executing at device 1202 and may facilitate tagging a given video on demand. In practice, device 1202 may have initially downloaded a Manifest file with metadata about the desired video on demand stream. This Manifest may have contained the location of multiple different profiles for each fragment (e.g., profiles with different bitrates and/or resolutions and/or languages and/or separate audio or subtitle streams or any other different type of variant). in practice, the manifest might also include the location of additional metadata or sub-Manifests that provide more information about a specific variant.

As shown, the application executing at device 1202 may eventually, occasionally, and/or routinely communicate messages to services platform 1222. The message(s) may indicate where the interesting parts are in a given media stream. This information may be stored for some period of time in a table similar to table 1130 of FIG. 11, which may be stored in memory system 1226. In practice, the tagging information may be associated with and/or included within a manifest for the given video and may represent additional metadata that is available to a subsequent requesting device. In some instances, a user of a device like device 1202 may send a message to a friend and invite the friend to watch the video. The message may also include information that allows the friend's device to access the "interesting content" location identifying data.

As mentioned above, a user of device 1202 may be tagging content and adding portion indicators 1216 and 1218 as he or she watches the video. The user of device 1202 could also be consuming a video that has already been tagged. In such a circumstance, device 1202 may request a manifest. The manifest may include information including some fragment identifying information associated with indicators 1216 and 1218. As the viewer of previously tagged content, a user of device 1202 may be able to use icon 1210 to skip to content tagged as interesting. As such, the user may have the option (e.g., by pressing star icon 1210 one or more times) to toggle, for example, between watching the video in its entirety, fast forwarding through everything except tagged portions, watching only tagged portions, etc.

In some implementations, a user may be able to access a drop down menu and/or an electronic programming guide (EPG) from within the application, and the EPG may operate as a source selection tool. Example sources included in the list could be: network television, streaming media accounts (e.g., YouTube, Netflix, Amazon Prime, etc.), suggested videos, genre-specific videos, trending videos, my shows, my channels, my local media sources (e.g., baby monitor, home security camera, etc.), "what my friends are watching," etc.

The "what my friends are watching" option could be implemented to allow one user to "see" what any "checked-in" friends are watching. The process of checking in may be facilitated by an in-application setting that allows one instance of the application to "tell" (via a backend service or some other technique) any user or a subset of users what a given user is watching. In practice, the component of the system keeping track of which adaptive bitrate segment a user has recently accessed may be used to facilitate the "what my friends are watching" feature. If a user selects "what my friends are watching", the application may provide a list of checked-in friends and what they are currently watching. The user can select one of the listed friends and begin watching the same video in a synchronized or nearly synchronized way with that listed friend.

In addition, the application may also include various available template designs. One template may include a primary viewing pane on the left hand side, a springing pane along the bottom, and a social media pane along the right side. Another template may include a mixed-media picture-in-picture template. The mixed media panes may allow, for example, a pane presenting a movie or television show being delivered as a streaming media signal and a nested or picture-in-picture pane presenting a video and/or camera image from a baby monitor, a security system component, etc. As such, a single mixed-media template may be presenting media received via a wide area network in one pane and media originating from a component of a local area network (e.g., a home wi-fi network) in another pane. Moreover, a user may be able to personalize the template by identifying and/or selecting the source for each pane.

The application may allow users to use a pre-existing template design and/or to create their own template design. Moreover, the application may also allow the users to share and/or make available for sharing the template designs they create. Depending on the design preferences of an application designer, an application may facilitate template creation, template sharing, template selection from some listing of existing templates, the addition and/or deletion of "saved" templates, etc. In addition, an application may include a menu of available templates. The application may also provide the ability to purchase a new template design and/or to sell a customized template design.

In addition, one of skill will recognize that template manipulation as well as the other features described herein could also be made available via a website. For example, a website may be created using, for example, HTML5. In practice, a user may "log in" via an application executing on a tablet. After logging in, the user may be presented with a preferred and/or default template having media source settings for various viewing panes already selected. If the user also has access to a personal computer or a laptop, the user may be able to log in via a website application and be presented with the same or a similar viewing template. In addition and like the tablet application, the website-viewed interface may allow for template design, template manipulation, media source discovery, media source selection, synchronized viewing with other users (whether the others users are using tablet applications, smartphone applications, website interfaces on laptops, etc), media tagging, and/or other features.

The above description includes a great deal of novel teachings. A designer will recognize that the teachings can be combined in many different ways. For example, discussions associated with FIG. 1 may be combined with the discussions of any one or more of the other figures, and such a mixing and matching of the teachings is an intended use of the teachings.

What is claimed is:

1. A video viewing system, comprising:
a network based computing system configured to communicate with a plurality of remotely located applications executing on handheld devices;
a memory system maintaining a video viewing application configured to be executed by a processor of a wireless handheld device and to communicate with the network based computing system; and,
the video viewing application further operable, when executed on a given wireless hand held device:
to establish a connection with a television through a local area wireless communications interface
to present a viewing window on a display of the hand held device;
to send a collection of information to the television to allow the television to present a representation of the viewing window on the television;
to request a plurality of sequential video fragments for a given video from a content delivery network component that is not the network based computing system, wherein at least two of the sequential video fragments have a different encoding profile;
to present the given video within the viewing window; and
to send the collection of information to the network based computing system to facilitate an identification by the network based computing system of a fragment-based location within the given video;
wherein the fragment-based location identifies at least one of a requested portion of the given video or a to-be-requested portion of the video;
wherein the network based computing system is configured to communicate a synchronize message to a remotely located instance of the video viewing application;
wherein the identification by the network based computing system of the fragment-based location is a data entry in a table, further wherein a device executing the remotely located instance of the video viewing application is operable to utilize HTTP to request a manifest for the given video, further wherein the synchronize message utilizes the data entry to facilitate identifying a location within the manifest.

2. A video viewing system, comprising:
a network based computing system configured to communicate with a plurality of remotely located applications executing on handheld devices;
a memory system maintaining a video viewing application configured to be executed by a processor of a wireless handheld device and to communicate with the network based computing system; and
the video viewing application further operable, when executed on a given wireless hand held device:
to establish a connection with a television through a local area wireless communications interface
to present a viewing window on a display of the hand held device;
to send a collection of information to the television to allow the television to present a representation of the viewing window on the television;
to request a plurality of sequential video fragments for a given video from a content delivery network component that is not the network based computing system, wherein at least two of the sequential video fragments have a different encoding profile;
to present the given video within the viewing window; and
to send the collection of information to the network based computing system to facilitate an identification by the network based computing system of a fragment-based location within the given video;
wherein the fragment-based location identifies a tagged portion of the given video;
wherein the network based computing system is configured to facilitate communication of a collection of metadata for the given video to a remotely located instance of the video viewing application, wherein the collection of metadata includes an indication that a fragment is tagged;
wherein a device executing the remotely located instance of the video viewing application is operable to utilize HTTP to request a manifest for the given video, further wherein the manifest includes a location for the collection of metadata.

3. A video viewing system, comprising:
a network based computing system configured to communicate with a plurality of remotely located applications executing on handheld devices;
a memory system maintaining a video viewing application configured to be executed by a processor of a wireless handheld device and to communicate with the network based computing system; and the video viewing application further operable, when executed on a given wireless hand held device:
to establish a connection with a television through a local area wireless communications interface
to present a viewing window on a display of the hand held device;
to send a collection of information to the television to allow the television to present a representation of the viewing window on the television;
to request a plurality of sequential video fragments for a given video from a content delivery network component that is not the network based computing system, wherein at least two of the sequential video fragments have a different encoding profile;
to present the given video within the viewing window; and,
to send the collection of information to the network based computing system to facilitate an identification by the network based computing system of a fragment-based location within the given video;
wherein the fragment-based location identifies a tagged portion of the given video;
wherein the network based computing system is configured to facilitate communication of a collection of metadata for the given video to a remotely located instance of the video viewing application, wherein the collection of metadata includes an indication that a fragment is tagged;
wherein the remotely located instance of the video viewing application is configured to present a collection of viewing options that includes a view tagged portion option.

4. A video viewing system, comprising:
a network based computing system configured: (1) to communicate with a plurality of remotely located applications; (2) to maintain a plurality of messaging accounts for respective users of the plurality of remotely located applications; and (3) to communicate an invitation to a given one of the plurality of messaging accounts relating to a given video;
a memory system maintaining a video viewing application configured to be executed by a processor of a wireless handheld device and to communicate with the network based computing system; and,
the video viewing application further operable, when executed on a given wireless handheld device:
to establish a connection with a television through a local area wireless communications interface;
to present a viewing window on a display of the given wireless handheld device;
to send a collection of information to the television to allow the television to present a representation of the viewing window on the television;
to receive a plurality of video fragments for the given video that is related to the invitation, the plurality of video fragments including video fragments identifiable by corresponding fragment-based locations;
to recognize a synchronize message from the network based computing system; and,
based on the synchronize message, to present the given video in the viewing window at a fragment-based location;
wherein the video viewing application is further operable, when executed on the given wireless handheld device, to present a plurality of video source options on the display including a "what my friends are watching" option. the video viewing application is operable to request the plurality of video fragments for the given video based on selection of the "what my friends are watching" option.

5. A video viewing system, comprising:
a network based computing system configured: (1) to communicate with a plurality of remotely located applications; (2) to maintain a plurality of messaging accounts for respective users of the plurality of remotely located applications; and (3) to communicate an invitation to a given one of the plurality of messaging accounts relating to a given video;
a memory system maintaining a video viewing application configured to be executed by a processor of a wireless handheld device and to communicate with the network based computing system; and,
the video viewing application further operable, when executed on a given wireless handheld device:
to establish a connection with a television through a local area wireless communications interface;
to present a viewing window on a display of the given wireless handheld device;
to send a collection of information to the television to allow the television to present a representation of the viewing window on the television;
to receive a plurality of video fragments for the given video that is related to the invitation, the plurality of video fragments including video fragments identifiable by corresponding fragment-based locations;
to recognize a synchronize message from the network based computing system; and,
based on the synchronize message, to present the given video in the viewing window at a fragment-based location;
wherein the plurality of video fragments includes a tagged portion identifiable by a fragment-based location, and wherein the video viewing application is further operable, when executed on the given wireless handheld device, to recognize selection of a view tagged portion option presented on the display of the given wireless handheld device, and to present the tagged portion of the given video in the viewing window in response to the selection.

6. A video viewing system, comprising:
a network based computing system configured: (1) to communicate with a plurality of remotely located applications; (2) to m messaging accounts for respective users of the plurality of remotely located applications; and (3) to communicate an invitation to a given one of the plurality of messaging accounts relating to a given video;
a memory system maintaining a video viewing application configured to be executed by a processor of a wireless handheld device and to communicate with the network based computing system; and.
the video viewing application further operable, when executed on a given wireless handheld device:
to establish a connection with a television through a local area wireless communications interface;
to present a viewing window on a display of the given wireless handheld device;
to send a collection of information to the television to allow the television to present a representation of the viewing window on the television;
to receive a plurality of video fragments for the given video that is related to the invitation, the plurality of video fragments including video fragments identifiable by corresponding fragment-based locations;

to recognize a synchronize message from the network based computing system; and, based on the synchronize message, to present the given video in the viewing window at a fragment-based location;

wherein the video viewing application is further operable, when executed on the given wireless handheld device, to present a multiple window display on the given wireless handheld device;

wherein the video viewing application is further operable, when executed on the given wireless handheld device, to present video received from a first video source in a first window of the multiple window display, and to present video received from a second video source in a second window of the multiple window display.

7. A video viewing system, comprising:

a network based computing system configured: (1) to communicate with a plurality of remotely located applications; (2) to m messaging accounts for respective users of the plurality of remotely located applications; and (3) to communicate an invitation to a given one of the plurality of messaging accounts relating to a given video;

a memory system maintaining a video viewing application configured to be executed by a processor of a wireless handheld device and to communicate with the network based computing system; and, the video viewing application further operable, when executed on a given wireless handheld device:

to establish a connection with a television through a local area wireless communications interface;

to present a viewing window on a display of the given wireless handheld device;

to send a collection of information to the television to allow the television to present a representation of the viewing window on the television;

to receive a plurality of video fragments for the given video that is related to the invitation, the plurality of video fragments including video fragments identifiable by corresponding fragment-based locations;

to recognize a synchronize message from the network based computing system; and, based on the synchronize message to present the given video in the viewing window at a fragment-based location;

wherein the video viewing application is further operable, when executed on the given wireless handheld device, to present a multiple window display on the given wireless handheld device wherein the video viewing application is further operable, when executed on the given wireless handheld device, to present video received from a first video source in a first window of the multiple window display, and to present video received from a second video source in a second window of the multiple window display;

wherein the first source is a component in a wide area network and the second source is a component in a local area network.

8. A video viewing system, comprising:

a network based computing system configured to communicate with a plurality of remotely located applications executing on handheld devices;

a memory system maintaining a video viewing application configured td be executed by a processor of a handheld device and to communicate with the network based computing system; and, the video viewing application further operable, when executed on a given handheld device:

to establish a connection with a television through a local area wireless communications interface of the given handheld device;

to present a viewing window on a display of the given handheld device;

to send a collection of information to the television to allow the television to present a representation of the viewing window on the television;

to send a collection of information to the network based computing system to identify a given video that a remotely located video viewing application is presenting on a handheld device;

to receive a plurality of video fragments corresponding to the identified given video; and, to present in the viewing window the identified given video at a fragment-based location that synchronizes presentation of the given video with presentation of the given video by the remotely located video viewing application;

wherein the plurality of video fragments includes video fragments having different encoding profiles, and wherein the video viewing application presents in the viewing window video fragments having a particular encoding profile that maintains synchronization of the presentation of the given video with the presentation of the given video by the remotely located video viewing application.

9. The video viewing system of claim 8, wherein the video viewing application further is operable to present in the viewing window a plurality of video sources, and wherein the video viewing application sends the collection of information to the network based computing system to identify the given video in response to selection of a given video source.

10. The video viewing system of claim 9, wherein the video viewing application further is operable to present a multiple window display on the display of the given handheld device, wherein video corresponding to a selected first video source is presented in a first window of the multiple window display and video corresponding to a selected second video source is presented in a second window of the multiple window display.

* * * * *